United States Patent
Inoue et al.

(10) Patent No.: US 7,346,562 B2
(45) Date of Patent: Mar. 18, 2008

(54) SYSTEM FOR PLACING ORDERS USING CUSTOMER-SPECIFIC ELECTRONIC CATALOG

(75) Inventors: Makoto Inoue, Kanagawa (JP); Kimio Ariga, Saitama (JP); Tsuguharu Nishizaki, Kanagawa (JP); Nobuhiko Hasegawa, Chiba (JP); Katsumi Ueno, Kanagawa (JP); Junji Ushironaka, Hyogo (JP); Youichi Matsuura, Kyoto (JP); Masamichi Kine, Nara (JP); Jun Benki, Hyogo (JP); Masaru Sashiki, Tokyo (JP)

(73) Assignee: Kokuyo Co., Ltd., Osaka-Shi, Osaka (JP)

( * ) Notice: Subject to any disclaimer, the term of this patent is extended or adjusted under 35 U.S.C. 154(b) by 550 days.

(21) Appl. No.: 09/933,119

(22) Filed: Aug. 21, 2001

(65) Prior Publication Data
US 2002/0038258 A1 Mar. 28, 2002

(30) Foreign Application Priority Data
Aug. 22, 2000 (JP) .............................. 2000-250878

(51) Int. Cl.
G06Q 30/00 (2006.01)
(52) U.S. Cl. ......................................... 705/27
(58) Field of Classification Search .................. 705/26, 705/27, 37
See application file for complete search history.

(56) References Cited
U.S. PATENT DOCUMENTS
5,319,542 A 6/1994 King, Jr. et al.
5,694,551 A * 12/1997 Doyle et al. ................... 705/26
5,758,327 A * 5/1998 Gardner et al. ............... 705/26
5,870,717 A 2/1999 Wiecha
6,023,683 A * 2/2000 Johnson et al. ............... 705/26
6,032,145 A * 2/2000 Beall et al. .................... 705/26
6,263,317 B1 7/2001 Sharp et al.

FOREIGN PATENT DOCUMENTS
WO WO-01/33392 * 5/2001

* cited by examiner

Primary Examiner—Gerald J. O'Connor
(74) Attorney, Agent, or Firm—McGinn IP Law Group, PLLC

(57) ABSTRACT

A system that executes and manages the purchase of items at low cost is disclosed. This system, based on merchandising of one or more dealers, uses a merchandise assortment (MD) of each dealer specified by a customer's purchase control department for example as a customer specific electronic catalog. Then, this MD/electronic catalog stores for each item the information necessary for specifying its dealer and supplier. A server 10 is equipped with an item specific ordering controller 14 that, when it has received an order issuing request for ordering one ore plural number of items from a terminal of a user who belongs to the customer's purchasing unit, specifies a dealer who offers each item based on the MD information of each said purchasing unit. By this, it becomes possible for each user of the customer to make purchases based on the purchasing standard determined by the purchase control department by only specifying necessary items even without knowing the dealer names.

4 Claims, 16 Drawing Sheets

FIG.8 (A)

| MERCHANDISE |
|---|
| ITEM NUMBER |
| SOURCE MAKER CODE<br>SUPPLIER ID<br>DELIVERER JUDGMENT FLAG<br>SPECIAL ITEM NUMBER CATEGORY<br>OTHER SITE AFFILIATION CATEGORY<br>INTRODUCTION IMAGE FILE NAME<br>MAKER SUGGESTED RETAIL PRICE<br>SCHEDULE DATE OF PRICE REVISION<br>MERCHANDISE CATEGORY<br>KEYWORDS FOR SEARCHING |

FIG.8 (B)

| MD UNIT |
|---|
| MD UNIT ID |
| SERVICE FORM ID<br>MD UNIT NAME<br>MAINTENANCE RESPONSIBILITY MANAGEMENT UNIT ID<br>CUSTOMER MANAGEMENT UNIT ID<br>PRICE RELATED INFORMATION DISPLAY ENABLE/DISABLE FLAG |

FIG.8 (C)

| MD (MERCHANDISE ASSORTMENT) |
|---|
| MD UNIT ID<br>ITEM NUMBER |
| OFFERED PRICE CALCULATION METHOD CATEGORY<br>OFFERED PRICE<br>PRICE FACTOR<br>DEALER PURCHASE PRICE<br>SUPPLIER MANAGEMENT UNIT ID<br>DELIVERER MANAGEMENT UNIT ID<br>EXPENSE ITEM CODE<br>GENERAL USER ORDER PROHIBITION CATEGORY<br>OFFERED PRICE ROUNDING CATEGORY |

FIG.11 (A) — 50

| CUSTOMER |
|---|
| MANAGEMENT UNIT ID |
| SERVICE FORM ID<br>CUSTOMER MANAGEMENT UNIT NAME<br>CONTACT DESTINATION SUCH AS ADDRESS<br>USER ACCEPTANCE CATEGORY<br>WELCOME SIGNBOARD IMAGE FILE NAME<br>DELIVERY DATE DISPLAY/NONDISPLAY FLAG<br>PRICE ETC. DISPLAY/NONDISPLAY FLAG<br>GENERAL USER ORDERING PROHIBITED ITEM NAME INFORMATION<br>INITIAL SCREEN ADDRESS (URL)<br>MANAGEMENT UNIT HOLIDAY FLAG |

FIG.11 (B) — 52

| USER |
|---|
| USER ID |
| MANAGEMENT UNIT ID<br>USER NAME<br>DIRECT DELIVERY DESTINATION ID<br>BILLING DESTINATION ID<br>BUDGET CONTROL UNIT ID<br>PASSWORD<br>ORDERING PROHIBITED ITEM ORDERING AUTHORIZATION FLAG<br>USER HOLIDAY FLAG |

FIG.13
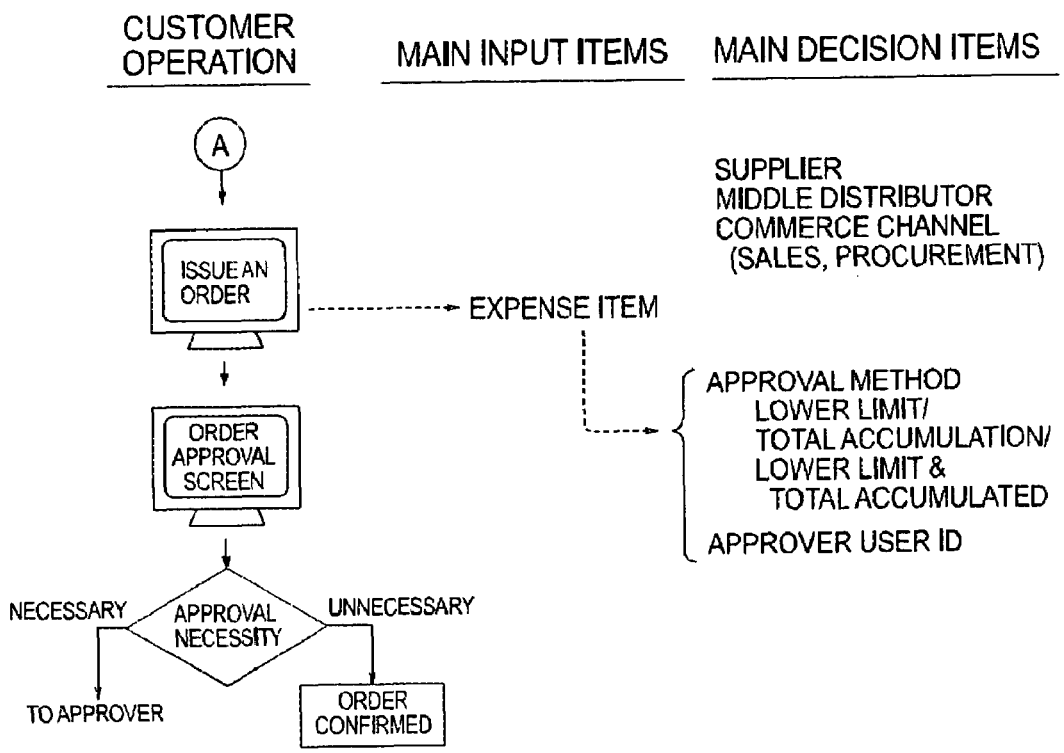
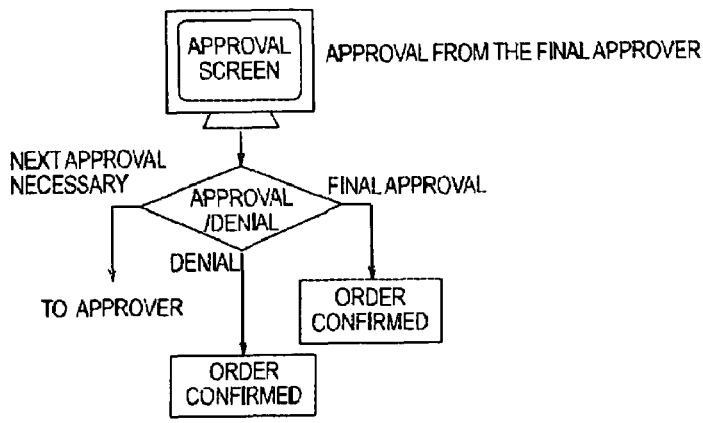

SYSTEM FOR PLACING ORDERS USING CUSTOMER-SPECIFIC ELECTRONIC CATALOG

BACKGROUND OF THE INVENTION

The present invention relates to an ordering system, especially an ordering system that controls sending/receiving orders between a customer to which many users belong and dealers who provide the users of the customer with goods, services, etc.

In organizations such as companies, many kinds and large amounts of MRO (Maintenance, Repair and Operations) such as stationery and tools and furniture are consumed. These consumable supplies are necessary for business management of the organization, purchases are controlled in relation to the budget and accounting.

Consumable supplies, tools, furniture, etc. are indirectly necessary for business activities and production activities and are known as non-production or subsidiary materials.

Purchases of non-production materials are made in small quantities, frequently, and in a wide variety, and the sellers who are dealers and their purchase condition are often different for each item and area. Therefore, purchase control by the organization is complicated. In large-scale organizations having hundreds of employees, a list of items to be purchased and their prices over a certain period are negotiated wit)h dealers. In general, a person in charge of the company's purchase department negotiates with dealers. Organizations such as companies attempt to the reduce work load of controlling purchases by engaging in purchase activities over a certain period in accordance with the negotiated results.

On the other hand, the ordering and sale of goods and services have been done via the Internet in recent years. Namely, the providers of the goods construct Web sites, and those who wish to purchase these goods electronically visit various kinds of Web sites and select the goods to be purchased. Goods and services offered using Web sites include books, groceries, automobiles, stationery, computers, transportation services, and gift services such as live flowers, etc. Offerings of good and services using Web sites are similar to shopping malls and shopping centers in the real world. Namely, each purchaser performs searches on a Web site that deals with the goods to purchase, compares the contents of the goods, and subsequently orders one to the Web site. Then the payment for the goods or service is done using a credit card, bank transfer, etc. In many cases, each of the goods etc. is sent directly to the purchaser's address. Also, in the case of gift services such as live flowers and gifts, the gifts are often sent directly to the recipients.

Also, business to business platforms utilizing the Internet have been gradually realized. These are developed mainly for the procurement of material directly used in the business and production activities. In many platforms, the selection process of materials and dealers to order from based on pricing conditions etc. is supported.

In purchasing items at prices decided between the customer and dealer beforehand, in order to issue orders based on the agreed upon conditions, the customer must place an order with the dealers and make reference to the conditions agreed upon with each of one or more stores, requiring certain knowledge in relation to placing orders and making requests.

In the example, unfortunately, it is difficult for a user himself/herself who wishes to obtain the item to perform the ordering process himself. In this case, there needs to be an indirect business in charge of placing the order, upon receipt of the request from the user himself/herself, resulting in enormous personnel costs (business cost, transaction cost, or personnel expense). Especially, when the items are low in price and of many kinds, the total purchase price to the organization may be exceeded by the management costs necessary for the purchase. Also, in order for a user (e.g., an employee other than the purchase department of the company) to issue an order, the user himself/herself in the organization has to know the dealer.

Keeping company employees informed of the individual dealers for each of the items also causes the personnel cost to increase.

Also, as to the management of purchase activities, such as budget control, the approval of items to be purchased, and accounting control related to purchases, if purchase conditions and purchase methods are unified in an organization, savings in the form of personnel cost reduction related to approval and accounting can be achieved. However, because the purchase of non-production materials is frequent and of many kinds, checking whether the enormous contents processed with handwritten slips conform with the organization's purchase regulations and agreements with the stores has been practically impossible.

Namely, in accomplishing purchases with handwritten slips, it is practically impossible to be thorough with a unified purchase condition and purchase method, and a huge personnel costs are incurred in trying to maintain a unified purchase method. On the other hand, because a unified purchase activity is difficult, the reduction of personnel costs also becomes difficult in managing purchases with accounting control. Especially, when there are trades with many dealers, this trend becomes significant.

Because purchasing activities and the management of non-production materials and subsidiary materials are indirect to regular business and production activities, although they should be performed at low cost, there has been the inconvenience that they require huge personnel costs in organizations cited in the earlier examples.

Because companies must create documents necessary to paying various kinds of taxes, and documents necessary for accounting reports, the purchases of non-production materials etc. and related accounting processing are indispensable for companies. The fact that the purchase management of non-production materials is an indispensable activity makes it difficult to reduce "invisible costs" related to the purchase of non-production materials. Namely, the purchase of non-production materials and related accounting processing cannot be eliminated.

Therefore, for the management of each company, an investigation of how to reduce costs related to the purchase of non-production materials becomes necessary.

Also, when taking advantage of the sale of items on a business-to-business platform or a Web site, a search must be made to find dealers that offer the required items. Also, because even a user who simply needs an item must solve the problem of at what price to purchase the item, each user must know the purchase conditions and method of purchase of the organization he or she belongs to.

Namely, from the standpoint of reduction of personnel costs in an organization, searching for stores that offer the item, comparing the prices, studying the purchase conditions etc. inside the organization, etc. are also considered as costs.

Conventionally, when an organization trades with many dealers, purchase-related personnel costs becomes large.

SUMMARY OF THE INVENTION

The object of the present invention is to offer an ordering system where inconveniences such as those cited in the conventional example are improved, and especially the purchase of a part of non-production materials or production materials can be executed and managed at low cost by immediately issuing an additional order when an item is consumed.

In the present invention, first, based on the merchandising of one or more dealers, the merchandise assortment (MD) of each of the dealers specified by the purchase control department of a customer, for example, is used as the electronic catalog of each customer.

In this MD/electronic catalog, information necessary to specify the dealer and supplier of each item is stored. A server 10 is equipped with an item specific ordering controller 14 that specifies the dealer offering each item based on the MD information by each corresponding purchasing unit when an ordering request for ordering one or more items is received from a user's terminal that belongs to a customer's purchasing unit. By this means, it becomes possible for the users of a customer to make purchases based on the purchase standards determined by its purchase control department by specifying only the necessary item, without knowing the dealer names.

In a trade utilizing the system by the present invention, a plurality of dealers compete with one another by considering their MDs and prices to obtain a periodic purchase contract, of one year for example, with a customer's purchase control department. At the point when a contract is made between a customer's purchase control department and a dealer, in an embodiment, one dealer is assigned for one item. Because of this, users such as the employees of a customer can make orders only by deciding on the items, without knowing the dealers or purchase conditions. If the dealer specific MDs individually determined according to the merchandising of a plurality of dealers are considered as one, the MDs are regarded as an electronic catalog for customer specified items and dealers. In the present invention, this kind of MD information is used as an electronic catalog.

More specifically, a system according to the present invention is equipped with a database that memorizes various kinds of masters, and a server that controls data communication with the terminals via the network and extracts or stores data to various kinds of masters in response to requests from terminals. Moreover, the database is equipped with a merchandise master where information on each item, such as the goods and services offered from dealers to customers, is stored with the item number unique to the item as the unit, and an MD related master where a list of traded items among the items stored in this merchandise master agreed upon between the customer and dealers is stored by each purchasing unit of the customer and by each dealer offering items to the customer as customer specific MD related information.

Also, the server is equipped with an item specific ordering controller so that, when the server has received an order request for ordering one or more items from a terminal used by a user who belongs to a purchasing unit, the user specified each item in the order request to a dealer offering the item based on the MD related information by each purchasing unit to which the user belongs, thereby achieving the desired objective.

In general, a customer (an organization such as a company) may trade with a plurality of dealers according to the kinds of items and the location of the customer's business office (user).

The present invention helps to realize this relationship between dealers and the customer as electronic trades. This system controls issuing/receiving orders between a customer and one or more dealers who offer items such as goods and services to the customer. Various kinds of goods or various kinds of services correspond to the items dealt to be handled. In a preferred embodiment, it is appropriate for the trade of items where a dealer who performs trades between a customer (e.g., the purchase control department) and dealers are is specified for each item, the price can be automatically determined when ordering, and a plurality of dealers are not selected for the same item. Such items include goods or services where no selection of a dealer is made according to the price negotiations or conditions at the time of purchase among consumable supplies, furniture, live flowers delivery services, services to create stamps, purchasing tickets, and books and the like. For example, it is better to deal mainly with non-selection items where no sorting, selection, or auction is done at the time of purchase, and for items whose purchase conditions are already set based on a periodically updated purchase contract.

In the present invention, a plurality of dealers who have trades with a customer are pre-specified. Then, an merchandising assortment (MD) is determined for each dealer in advance. On the other hand, the specifications, categories, etc. of items offered by one or more suppliers and sold by dealers are controlled by one merchandise master. Because of this, an MD related information is created for each combination of dealers and a group of a customer's users (purchasing unit). By using the MD related information, any user who belongs to a customer can order individual items without being conscious of from which dealer it should be ordered, selecting the necessary items at one time, and issuing orders to a plurality of dealers through a one-time ordering procedure.

Specifically, in the present invention, stored in the database is an MD related master which includes MD related information which is a list of traded items among the items stored in the merchandise master agreed upon between the customer and dealers by each purchasing unit of the customer and by each dealer offering the items to the customer. The customer's purchasing unit (group of users) can be organization unit such as a division and department, and can also be a group of users existing in the same region, and can further be each user. In a preferred embodiment, once the user ID is specified, an MD related information group (customer specific electronic catalog) is specified, and once the item to be ordered is specified and the item number is determined, unique MD related information is specified.

When an ordering request for ordering one or more items is received from a user's terminal that belongs to a purchasing unit, an item specific ordering controller specifies a dealer offering each item of the ordering request based on the MD related information by each corresponding purchasing unit (a user or a group of users) the user belongs to. Namely, in the present invention, instead of offering the customer all of the items stored in the merchandise master, only the handled items which are pre-determined between the dealer and the customer are offered to the customer. This relationship between the dealer and the customer is controlled by the MD related information. The MD related information is a result of merchandising by dealers and selections by the customer's purchase control department, and moreover a result of price negotiations between dealers and the purchase control department. The MD related information is defined separately for each combination of the customer's purchasing unit and a dealer. For example, if there is a purchasing unit (1) and three trading dealer companies, information relating to three MDs are is provided to the purchasing unit.

Once a dealer is specified, the price etc. offered from the customer to the dealer can be uniquely specified. By this means, orders can be issued by selecting necessary items through the same ordering procedure from among a plurality of items handled by the different dealers, and moreover a plurality of items in various fields can be selected at one time and the order can be processed.

Therefore, compared with the fact that order processing is done by the purchase control department without the direct issue of an order by a user who belongs to the organization for the sake of business efficiency inside the organization, when ordering with a handwritten slip, for example, the present invention enables the user to work directly on an order for various kinds of items which are provided by a plurality of dealers and whose prices are preset by the purchase control department. Furthermore, from the user side, each dealer is specified by only specifying the item, enabling the submission of a group order irrespective of dealers.

In an embodiment where offered prices, shipping methods, etc. are set in the MD related information, in response to the issuance of the order, other processing can be further automated. By this mechanism of automatically placing orders with a plurality of dealers according to the items using the MD related information, the total cost related to purchases by a customer can be reduced.

In the present invention, item numbers for identifying items are given to the merchandise data inside the order issuing/receiving control system and merchandise data controlled by external servers, such as those of affiliated suppliers. For merchandise data controlled by external servers (other sites), item numbers of that site may be used. In the merchandise master, the specification of goods or services, locations where image files for explanation are stored, and the attribute information of each item itself, such as supplier names, are stored. On the other hand, attribute information on distribution of each item can be stored in the MD related information according to contracts etc. made between dealers and the customer. For example, a list of items handled through issuing/receiving orders between the customer and dealers, prices offered to the customer, and the calculation method of prices offered, and other suppliers are stored in the MD related information.

By using the merchandise master and MD related master properly, when a change in the attribute of an item itself occurs, the change is reflected in all the trades by updating only one merchandise master. On the other hand, by generating MD related information for each combination of a dealer and a customer's purchasing unit, the flexible issuance of orders from a customer to a plurality of dealers can be controlled. In a preferred embodiment, suppliers are responsible for controlling storing etc. concerning the contents of the merchandise master.

The ordering system of the present invention stores MD related information which is a list of items pre-determined for each purchasing unit of the customer and the dealer (store) offering each item to the customer, from among the items stored in the merchandise master. When an ordering request for ordering one or more items is received from a user's terminal, an item specific ordering controller specifies a dealer offering each item of the ordering request based on the MD related information by each corresponding purchasing unit the user belongs to. Because of this, a user who needs to obtain items can select the necessary items and perform an ordering process without searching for the items by dealer for each of the items. At this time, even if the content specified by the user is only items, the item specific ordering controller can refer to the MD related information and specify dealers who handle the items. Therefore, the user can order an item without knowing the dealer name etc. of each item. In this way, a user who tries to obtain items can select necessary items from among a plurality of items and order them without utilizing different systems for different stores, respectively.

Moreover, even when the item specific ordering controller has received an ordering request to order a plurality of items, because a dealer is specified for each of the items, the user can select items of different kinds at one time and make a group order, simplifying and speeding ordering. Moreover, once customers become able to order a plurality of items at one time without being limited to a dealer, ordering by unit of accounting processing or budget control becomes possible, realizing a purchase control including budget, approval, and accounting at low cost. In this way, if the ordering system by the present invention is used, the purchase of goods and services centering on non-production materials can be executed and controlled at low cost.

Also, in another preferred embodiment, commerce channels and physical logistics relating to the distribution of items can be separated. Namely, sales are performed by each dealer, transferring the ownership of items to its customer, and actual items can be delivered directly from the deliverer to a user of the customer. In this way, without being the physical distribution (physical logistics) of each item, ownership of the item can be transferred from the supplier via a middle distributor or a dealer to the customer (commerce channel) Each dealer performs sales by making a periodic purchase contract with the customer without having any stock or delivery during that period.

On the other hand, by using a deliverer, more efficient physical logistics to a plurality of customers can be realized. Moreover, stock control can be performed better by making suppliers the subject who should keep the stock.

Then, because no price negotiation is performed for each order between the customer and dealers in the system of the present invention (it having been agreed on beforehand over a specified period), prices through the distribution path can be decided in advance. Also, because once the items have been identified, the suppliers are determined, and a deliverer can be automatically specified for each item. By these, the present invention according to the present embodiment as a distribution facilitating system specifies a pre-determined commerce channel upon receiving an order from a customer's user, and accomplishes separate control so that the item is delivered from the deliverer to the customer's user.

In this way, the suppliers can be automatically specified based on the relationship between the item numbers selected for ordering and the dealers who receive the orders of the items. Item numbers and suppliers correspond to each other by one to one. Even if two are the same product, they have different item numbers if the suppliers are different. If the dealer himself performs an envelope printing service etc., the dealer himself becomes the supplier. Also, concerning goods, if a dealer himself has a stock and distributes it by himself, the dealer becomes the supplier. And, in an example where the supplier is the subject who should have a stock, each item is sent directly from the supplier to the customer in the name of the dealer. Once the dealer and the item number are determined, the dealer and the supplier are determined.

Then, in a preferred embodiment, once the dealer and the supplier are determined, the middle distributor such as a wholesaler and the deliverer are uniquely specified. By this, human judgment for specifying a commerce channel at the time of issuing an individual order becomes unnecessary.

The relationship among customer, dealer, and items follows a pre-determined contract. In a preferred embodiment, once a customer and an item number are determined, the dealer is uniquely specified. Namely, for the same goods or service, a periodic purchase contract is concluded with only one dealer. Also, as another embodiment, under a periodic purchase contract with a plurality of dealers for the same goods, a dealer can be specified according to delivery time, price, and pre-determined order of priority without the need for human judgment.

BRIEF DESCRIPTION OF THE DRAWINGS

FIG. 8 is an explanatory chart showing a representative example of items for each master in the present embodiment, where FIG. 8(A) is a chart showing an example of items of the merchandise master, FIG. 8(B) is a chart showing an example of items of the MD unit master, and FIG. 8(C) is a chart showing an example of items of the MD master.

FIG. 9(A) is a chart showing an example of items of the user MD unit master, FIG. 9(B) is a chart showing an example of items of the customer/dealer correspondence master, and FIG. 9(C) is a chart showing an example of items of the commerce channel management master.

FIG. 10(C) is a chart showing the relationship with parties for direct shipping.

FIG. 11 is an explanatory chart showing a representative example of items of each master in the present embodiment, where FIG. 11(A) is a chart showing an example of items of the customer master, and FIG. 11(B) is a chart showing an example of items of the user master.

FIG. 13 is an explanatory chart showing the last stage of a representative action example following FIG. 12.

DETAILED OF THE DESCRIPTION OF THE PREFERRED EMBODIMENTS

Figure 1:
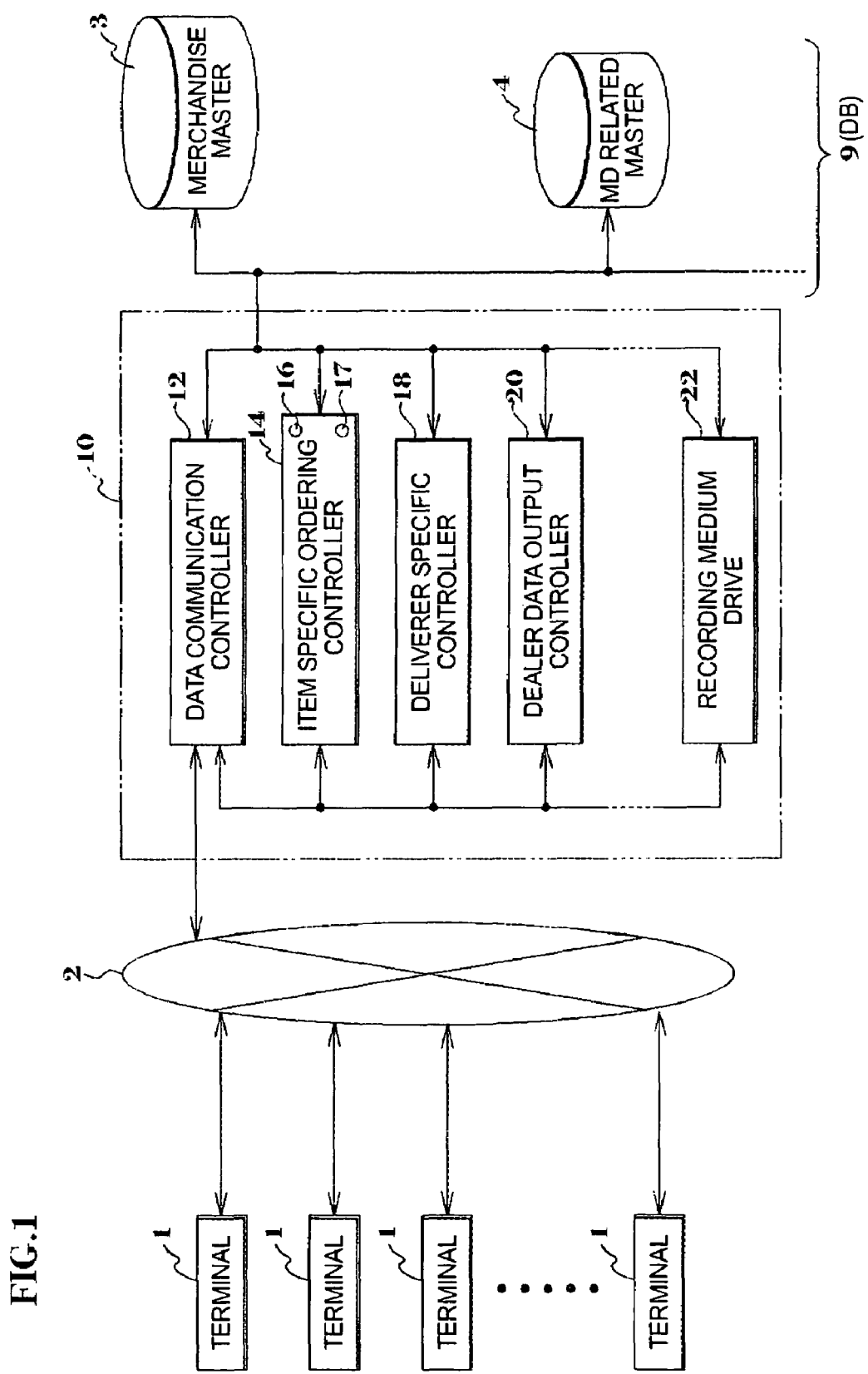
FIG. 1 is a block diagram showing a configuration of an embodiment of the present invention.

An embodiment of the present invention is explained hereafter, with reference to the drawings. FIG. 1 is a block diagram showing the configuration of an embodiment of the present invention. The ordering system according to the present embodiment is equipped with a database (DB) 9 that memorizes every kind of master, and a server 10 connected to a specified terminal 1 via a network 2, such as the Internet. The server 10 is equipped with a data communication controller 12 that controls sending/receiving data with the terminal 1, and performs data extraction or storing to every kind of masters 3 and 4 upon request from the terminal. When the network is set to the Internet, the server 10 is better equipped with a Web server that communicates with a browser of the terminal according to the http protocol and a database server that drives the database upon request from this Web server. In the configuration of the present embodiment, issuing/receiving orders between a plurality of customers (customer management units) and a plurality of dealers can be executed on a single server. Dealers can be sales stores of stationery consumables, sales stores of office furniture, and sales stores of scientific equipment for example. They may be sales stores having actual stores or sales persons without stores. Assumed as the customers are organizations such as a company with a general affairs department that makes decisions regarding purchasing, a division etc. that is engaged in business, and the number of users at a certain scale or higher, for example.

In the example shown in FIG. 1, the database 9 is equipped with the merchandise master 3 where information on items such as goods and services offered from dealers such as sales stores to the customers is stored by a unique item number for each of the items, and the merchandise assortment (MD) related master 4 where a list of traded items from among the items stored in this merchandise master agreed upon between the customer and dealers is stored by each purchasing unit of the customer and by each dealer offering items to the customer as customer specific MD related information. The items for which orders are issued and received are goods such as non-production materials and subsidiary materials, and various kinds of services.

Each item for which orders are issued/received is an item for which a customer (a user who belongs to the customer's purchasing unit) issues an order to a dealer and the dealer receives an order from a customer. A list of traded items is determined through selection by the customer's purchase control department in response to the merchandising of the dealers. Prices are determined according to negotiations between the person in charge of the customer's purchase control and dealers based on their price negotiation. Proposals for items having less environmental impact, proposals for using items that match the office layout, etc. are performed according to the characteristics of the dealer and the customer.

It may be arranged so that the merchandise master 3 should store not only merchandise data controlled inside the ordering system, but also information on merchandise data controlled by Web sites, such as those of affiliated suppliers. Also, it is more preferable that information relating to items controlled by other sites be obtained by collaborative processing every time an order is placed. In the present embodiment, to make it easy to explain, all the goods and services handled by dealers are assumed to be stored in the merchandise master 3. Also, when trying to trade items not stored in the merchandise master, established in a personal meeting between a customer and a dealer, and new items should be stored in the merchandise master first before creating an MD. In the present embodiment, even when a plurality of dealers handle the same merchandise, explanatory images of the merchandise and information on its supplier etc. are controlled by a single merchandise master 3. Because of this, dealers do not have to store or maintain information on the individual item itself.

The server 10 is equipped with an item specific ordering controller 14 which, when an order request for ordering one or more items is received from a terminal used by a user who belongs to a purchasing unit, specifies a dealer offering each item in the ordering request based on the MD related information specific to the purchasing unit to which the user belongs. A purchasing unit is a group of users who make purchases from the same dealer under almost the same conditions according to the division, location, authority each user has, etc. Depending on the customer's purchase behavior, there are cases where a purchasing unit is set to each user or a group of divisions in a specific location.

Figure 2:
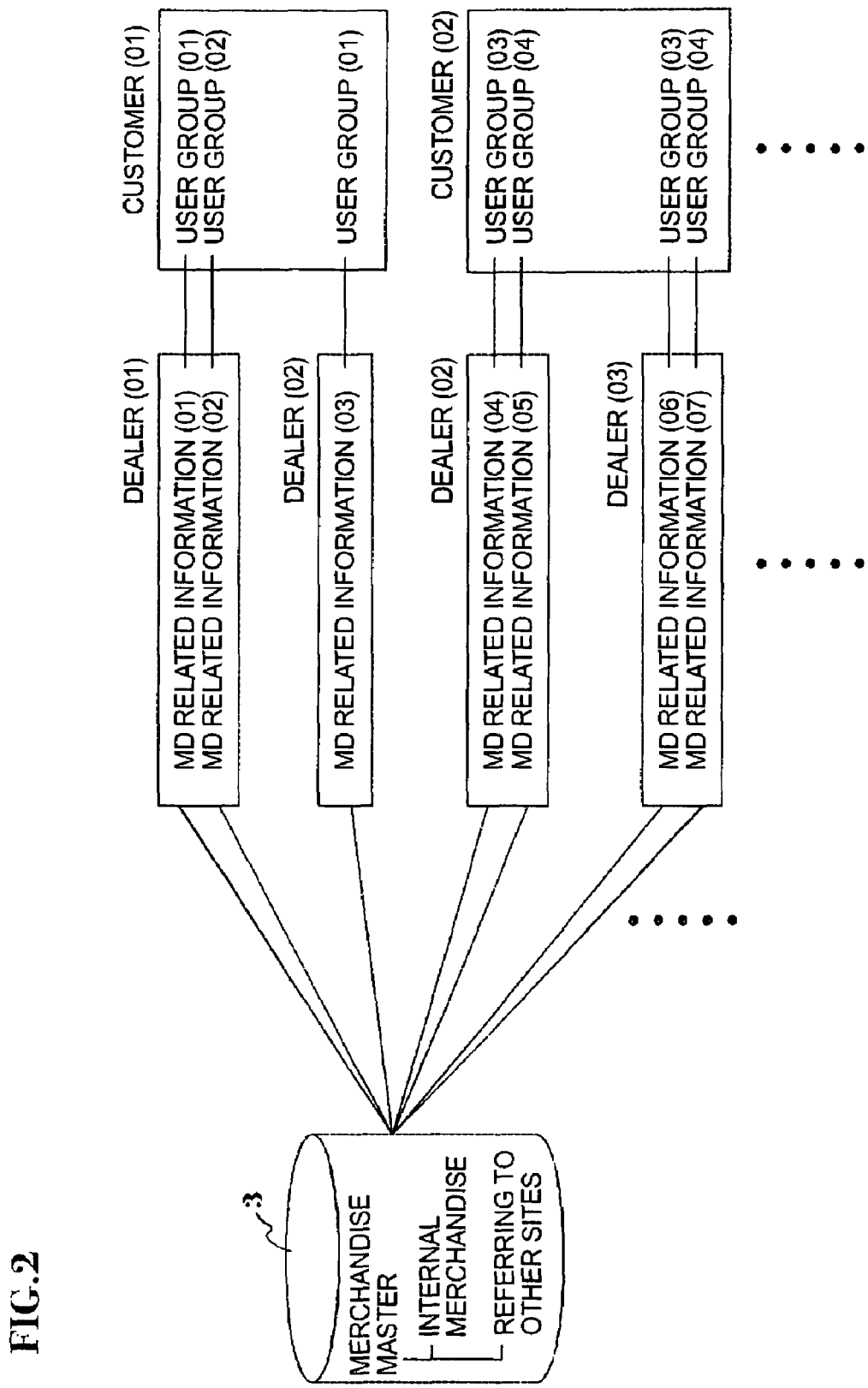
FIG. 2 is an explanatory chart showing the relationship between the MD related information used in the configuration shown in FIG. 1 and a customer's purchasing unit (group of users).

As shown in FIG. 2, a group of users of a customer (purchasing unit) and dealers are connected by MD related information, and items contained in the MD of the MD related information are items stored in the merchandise master 3. By using a merchandise master and MD related information stored separately for each group of users and dealers, storing and updating of information for each item are to be done only once in the merchandise master. In the example shown in FIG. 2, a dealer (01) has two pieces MD related information (01 and 02) separate for each group of users to a customer (01). A dealer (02) has one piece of MD related information (03) for the customer (01).

A group of users (01) of the customer (01) can make purchases by ordering items assorted in the MD related information (01) of the dealer (01) and items assorted in the MD related information (03) of the dealer (02). In the two pieces of MD related information (01 and 03) to the same group of users (01), it would be better to define the MD related information so that the same item is not duplicated. If there is no duplication of items in a plurality of MDs to the same group of users, when a user specifies an item, a dealer who has the MD of the item can be specified uniquely. In the present embodiment, by configuring it so that, when this group of users and an item are specified, a dealer can be automatically specified, the specifications of the party for ordering each item and commerce channeling are performed. Because of this, it is preferred that the MD related master 4 be stored in a condition where the items numbers purchased by a customer's purchasing unit do not overlap among dealers.

Seen from the group of users (01), MD by two pieces of MD related information (01 and 03) is an electronic catalog specified by the purchase control department of the organization to which the users belong. Users can make purchases under a condition determined by the purchase control department of their organization by issuing orders using this electronic catalog.

In this way, unlike commercial platforms or general Web sites, the present embodiment is characteristic in that no selection of a dealer is made by price comparison or condition comparison, and a dealer is specified automatically and forcibly at the time of issuing an order following pre-determined rules. By this means, each user of an organization such as a company can directly issue an order using a nearby terminal (e.g., a computer with a browser software to display a page described in a mark-up language such as HTML installed) following the parties from which to make purchases, purchase conditions, and purchase methods pre-determined by the purchase control department of the organization. Once each user can directly order items, the stock amount at the department in charge of purchases can be reduced, and necessary amounts can be ordered as needed. Not only the cost reduction due to this reduction of purchasing unit price and stock, but also direct and indirect personnel costs necessary for purchase control can be reduced. Once the ordering system of the present embodiment is adopted, it is imagined that cost reduction reducing personnel costs will actually he the largest. For example, when the total purchase amount of consumables by an organization per year is "100", the personnel cost for employees controlling this "100" can be "300".

However, because consumables are indispensable for work, they must be procured, and because reports related to taxes and accounting processing are indispensable, reduction of the cost of "300" (invisible cost) has not been easy.

However, by adopting the ordering system of the present embodiment, work of the purchase control department becomes the determination of an MD for each dealer once every several years, and actual ordering is done by each user. And, in a preferred embodiment, because the order amount and billed amount can be obtained electronically, compared with the conventional handwritten slip control, the personnel time required for the approval and accounting process can be greatly reduced. Thus, in the present embodiment, even invisible costs can be reduced, and the indispensable issuing/receiving orders of non-production materials can be controlled at lost cost.

When there are MDs of a plurality of dealers for the same group of users (customer's purchasing unit) and in a solution where there is overlapping of items existing among dealers and one dealer has to be specified among a plurality of dealers at the time of issuing an order of items, it is better to adopt a configuration where a dealer is automatically specified based on specified conditions. For example, when item numbers purchased by a customer's purchasing unit overlaps among dealers, the MD related master 4 has dealer determination items such as delivery times, prices, and dealer priority ranks for specifying a dealer according to the item number. The item specific ordering controller 14 is equipped with an overlapped dealer specification function 17. This function, when dealers overlap for item numbers of which an issuing an order is requested when an order issuing request is received from a user who belongs Lo a purchasing unit, specifies a dealer for the item number based on the dealer determination items such as dealer specific delivery Lime arid price of the item number, and a dealer's priority rank.

The overlapped dealer specification function 17 may be arranged so that, when dealers overlap for an item for which issuing an order is requested, a dealer is specified based on the priority rank among dealers pre-determined by the customer, and it also automatically and forcibly specifies a dealer for the item number based on the dealer specific delivery time and price of the item number at the time of issuing the order. By this overlapping dealer specification function 17 as well, each user can order items without being aware of the handled items etc. of the dealers at the time of ordering items. Namely, ordering according to the operation inside an organization on which item should be ordered from which dealer can be maintained.

In the example shown in FIG. 2, the dealer (02) also has trades with a customer (02). At this time, even if the MD for the customer (01)'s group of users (01) and the MD for the customer (02)'s group of users (03) are the same, different pieces of MD related information are stored. By making such a configuration, the information on distribution of each item can be stored in the MD related information according to the relationship between the customer and the dealer. For example, even if MD (a list of items) is identical between the MD related information (03) and (04), when offered prices to the customer (01) and the customer (02) are different, and even when deliverers who deliver the items are different, by defining the attribute information on distribution defined for each item in the MD related information (03) and the attribute information on distribution in the MD related information (04) respectively, the purchase, sales, and delivery arrangement can be automated.

As a simplification for systematizing a complicated distribution network, it is good to adopt a mechanism where each item is delivered to the customer by the deliverer in the dealer's name. If the dealer has a stock and make deliveries to its customers, the dealer himself is stored as the deliverer.

In the example shown in FIG. 1, the server 10 is equipped with a deliverer specific controller 18 which, when an order request for ordering one or more items is received from a terminal used by a user who belongs to a purchasing unit, specifies a deliverer offering or delivering the goods or service for each item number by referring to the MD related information specific to the purchasing unit, and a dealer data output controller 20 that outputs to the terminal 1 used by the deliverer the dealer data for delivery from the deliverer specified by the deliverer specific controller 18 in the name of the dealer specified by the item specific ordering controller 14.

The deliverer specific controller refers to the MD related information specific to each purchasing unit (group of users) of the customer, and specifies a deliverer that offers delivered goods or services to users for each item number. In this example, a deliverer who delivers an item to a customer for each relationship between a customer and a dealer and each item or item group (merchandise category) is pre-stored in the MD related information.

Also, in large-scale organizations, budget control and approvals are performed for each kind or use of non-production materials. In this example of performing budget control and approval control, an approval standard specific ordering controller 16 simplifies budget control etc. As the approval standard, whether an approval is performed or not, budget control, and the approval path in the group of approvers to perform an approval, etc. are defined. The item specific ordering controller 14 shown in FIG. 1 is equipped with an approval standard specific ordering control function 16 where, if the approval standard for ordering items by each customer is determined and one or more items are specified by users of the customer, and when the approval standards of the specified items and newly added items are different, addition of the new items is not accepted and a group ordering of those with the same approval standard is prompted.

The approval standard specific ordering control function 16 obtains approval standard related information such as an approval path, a person authorizing the budget, the upper limit amount requiring an approval, and a cumulative purchase amount over a certain period, such as a month, based on the budget or approval control unit (budget control unit) the user belongs to and the expense item for example. The expense item of each item is used for identifying the itemization unit such as account titles for accounting, classification of expenses of an individual organization, and the budget unit.

Budget and approval are controlled by each kind of goods or services, or the department to which the user belongs. Also, the purchase amount of an item for a project cannot be expended from a budget for another project. Conventionally, necessary items were ordered separately from each of many dealers and also by each budget unit separately. In the present embodiment, orders to a plurality of dealers can be made at one time. Specifically, each user can choose necessary items for ordering irrespective of the dealer, and hand them over to the approval process. In this case, by the approval standard specific ordering control function 16, when an expense item is pre-determined for each item or input at the time of ordering, the maximum range that can be ordered at one time (namely, the unit of purchase data or billing data) is set Lo the range for same approval standard. Thus, it becomes unnecessary to obtain an approval for each divided purchase amount when items that belong to separate budget control units are ordered at one time. On the other hand, even if dealers or categories (ballpoint pens, electric bulbs, live flowers, etc.) are different, if they are in the same budget unit, they can be handed over to the approval process at one time.

In this way, in an embodiment having an approval standard specific ordering control function 16, ordering can be converted from conventional ordering by dealer to group ordering by budget control unit or approval unit, making it possible to perform approval at one time. Also, budget control and accounting control become easy, contributing to the reduction of invisible costs. In this example, in order to limit the maximum range of group orders by approval unit, purchases to be approved and purchases not requiring approval can be established according to the customer's actual situation and controlled automatically.

Figure 3:
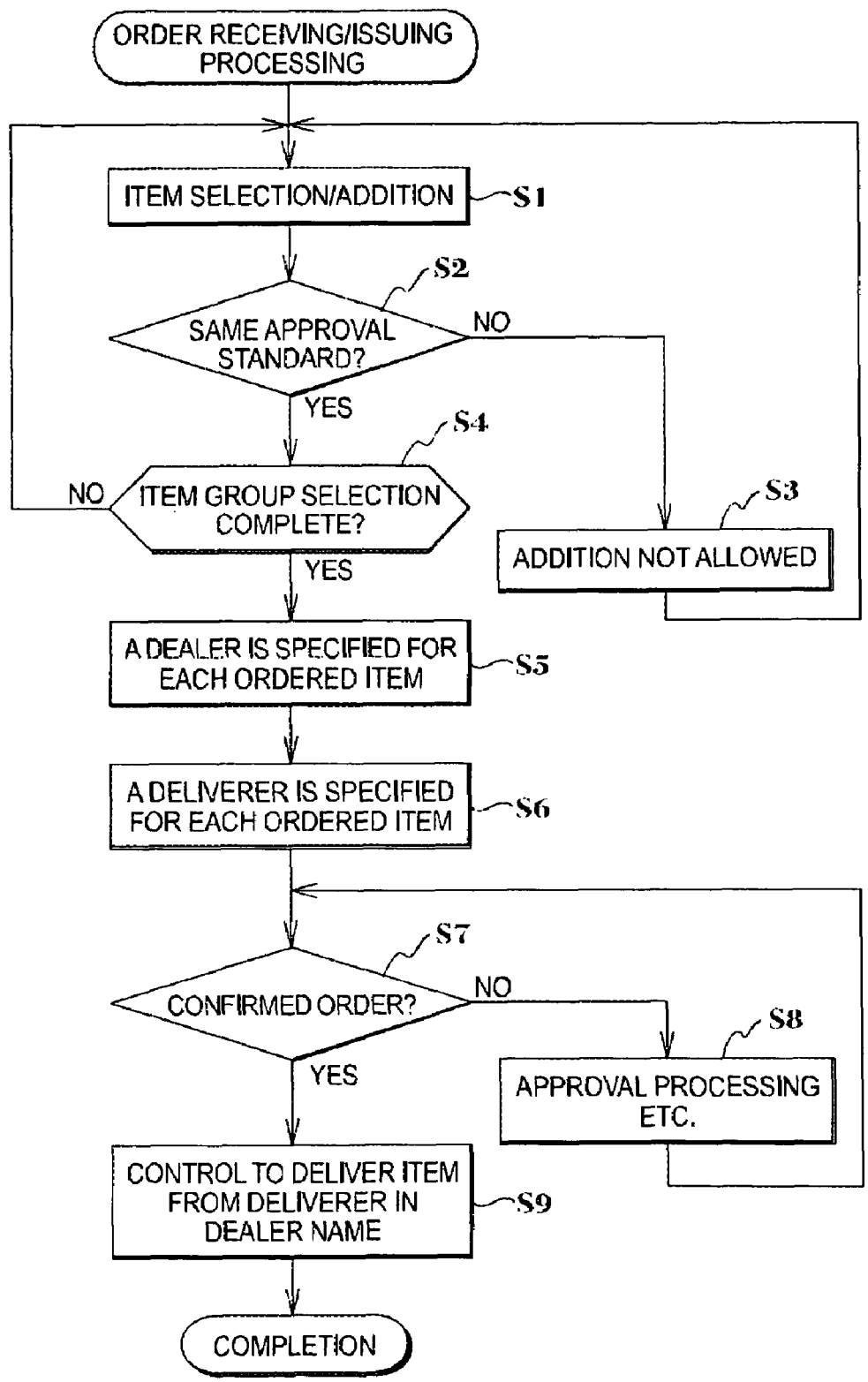
FIG. 3 is a flow chart showing an example of the order issuing/receiving process in the configuration shown in FIG. 1.

FIG. 3 is a flow chart showing an example of the order issuing/receiving processing in the configuration shown in FIG. 1.

As shown in FIG. 3, first, selection and addition of items are performed by a user (Step S1). At this time, the approval standard of already selected items and the approval standard of items added at this time are compared (Step S2), and when the approval standards are different, the addition to the group order is denied (Step S3). On the other hand, if they are identical approval standards, even if dealers of the items are different, they are added to the order item group. If the approval standards of items are different, their approval processes are different.

Because the approval standard specific ordering control function 16 (Step S2, S3, etc.) prompts the user to make them to be a different group of order items when they have different approval standards, items with different paths of approval process can be prevented from being ordered at one time. Namely, instead of ordering separately by each dealer, group ordering separated by each approval standard can be performed.

It may be better arranged so that each group of order items is temporarily stored using a shopping cart function commonly used, for example, on sales sites on the Internet.

Once selection of an item group is complete (Step S4), referring to the MD related information, a dealer is specified for each item subject to ordering (Step S5), and subsequently a deliverer of the item is specified (Step S6). Subsequently, when it has become a confirmed order (Step S7) in response to a formal order request or an approval by approvers (Step S8), a control for delivering item group from their respective deliverer in each corresponding dealer name is performed (Step S9). As to the commerce channels among the dealers, deliverers, and suppliers of each item, the item is automatically handed over from the supplier to the deliverer, and also systematization may be performed so that the sales/stock relationship from the supplier to the dealer is specified. Also, it may be arranged so that the dealer's stock is accumulated in the deliverer's storage.

Figure 4:
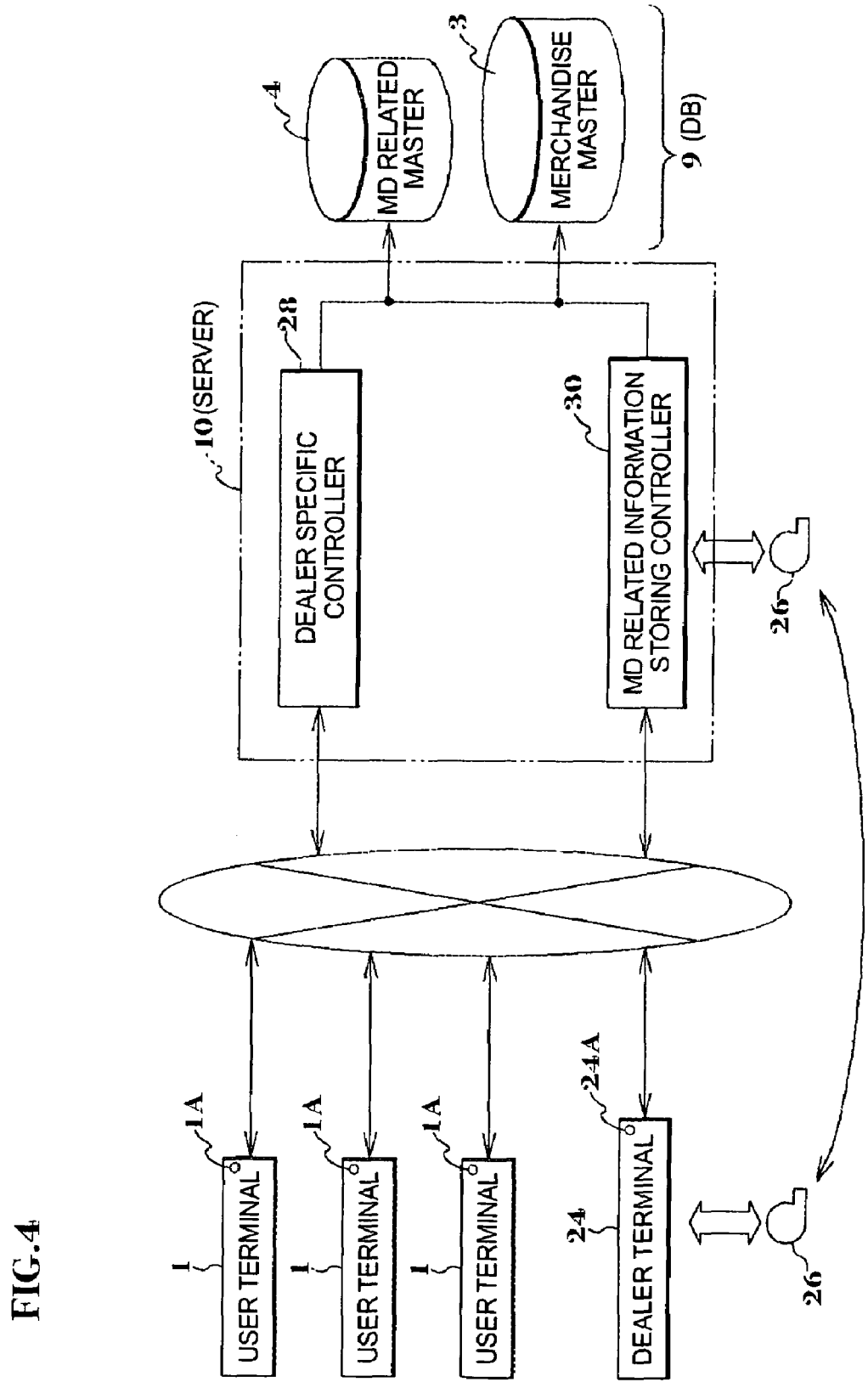
FIG. 4 is a block diagram showing an example of configuring the order issuing/receiving ASP system according to the present embodiment.

FIG. 4 is a block diagram showing an example of configuring an order issuing/receiving ASP system according to the present embodiment.

In the example shown in FIG. 4, using a database 9 which memorizes various kinds of masters, such as a merchandise master where information related to items of goods or services, and a server 10 which is connected to a browsing terminal via a network such as the Internet, controls data sending/receiving with the browsing terminal, and extracts or stores data of various kinds of masters in response to requests at the browsing terminal, an order issuing function is provided to terminals of one or more users who belong to the customer's purchasing unit, and also an order receiving function is provided to terminals of a plurality of dealers who offer items identified by item numbers to the customer. Each browsing terminal displays a page sent from the server and sends various kinds of requests to the server 10 according to operation of links in the page and an execute button. In the example shown in FIG. 4, a browser used by a user of a customer is called a user terminal 1, and a browsing terminal used by a dealer a dealer terminal 24. The server 10 sends a page described in a mark-up language such as HTML and XML to each of the terminals 1 and 24, according to data input via the page or operation of an execute button etc. on the page, data stored in various kinds of masters are searched and a page is generated, and by sending this generated page to the terminal, various kinds of functions are offered to each of the terminals 1 and 24. Each terminal only needs to have a communication control function that controls communication with the server 10 and a browser function that interprets a specified mark-up language and displays it, which can realize on the terminal via communication with the server 10 the same function as in the case when the application software is installed on each terminal.

The server 10, first of all, is equipped with an MD maintenance controller 29 that offers a browsing terminal (dealer terminal) 24 an MD maintenance function 24A for maintaining an MD related information which is a list of items among the items stored in the merchandise master 3 that are traded between a customer and dealers pre-determined separately by each of the customer's purchasing unit and by each of the dealers. The MD maintenance function 24A is a function for generating proposal data such as a list of merchandise to be used for a dealer to determine items to trade with new or renewing customers. Also, it may be equipped with a function to maintain MD related information already generated.

The server 10, secondly, is equipped with an MD storing controller 30 which controls storing, offline or online to the database, MD related information maintained according to control by the MD maintenance controller as an MD related information master. The MD storing controller is a function for storing to the MD related master 4 MD related information which is maintained by the dealer terminal 24 and obtained online via the network 2 or offline by a magnetic tape 26 etc.

Thirdly, the server 10 is better arranged so that its dealer specific controller 28 provided to each user's browsing terminal is equipped with a specification function 1A which, when one or more items are ordered from a terminal of a user who belongs to a purchasing unit, specifies a dealer who offers goods or services for each item number by referring to the MD related master for each purchasing unit to which the user belongs. Thus, group ordering of various kinds of items is made possible. The processing and advantage of the dealer specific controller 28 are almost the same with those of the item specific ordering controller 14 shown in FIG. 1.

Also, in the same way as in the examples shown in FIG. 1 etc., if the MD related master 4 stores so that item numbers purchased by a customer's purchasing unit do not overlap among a plurality of dealers, each user can specify a dealer that sells an item only by specifying the item.

In this ASP system, a transaction of an amount according to an order becomes purchase data for the customer and credit sale data for the dealer. And, the provider of the application service is like a third party to these customers and dealers, and executes the transaction of the amount by this ASP. Therefore, the customer and the dealer can easily trust the execution results (billed amount and paid amount) of the transaction, and it is easy for the customer and the dealer to reduce the work load of matching their settlements.

Also, compared with the case where the customer side develops an ordering system, if this application service is introduced, updating the merchandise database, determining traded items, etc., which are the most troublesome in purchase systems, can be performed by outsourcing, and thus by organizing the specifications of purchase data etc. provided by the ASP to the customer side system, it becomes possible on the customer side to automate ordering processing while using the pre-existing approval processing system and accounting processing system as they are.

Also, seen from the dealer side, by a plurality of customers utilizing an application service in the present embodiment, there will be no need to deal individually with ordering data issued from systems which differ among customers.

The configuration shown in FIG. 4, FIG. 1, etc. can be realized by executing a program (script) according to each function on the server 10. The ordering system program to make a computer for a server to function as the server 10 of the ordering system is equipped with an MD related information control command (or code) for controlling MD related information which is a list information of items traded between customers and dealers pre-determined for each customer's purchasing unit and dealers who offers the item to the customer, and an item specific ordering control command (or code) that specifies a dealer who offers the goods or service separately for each item number by referring the MD related information for each purchasing unit when a request of ordering one of more items at one time from a terminal used by a user who belongs to the purchasing unit has been received, as commands or codes for operating the computer used as a server. Also, in order to make a server use computer functions as a deliverer specific controller 19, the ordering system program should be equipped with a deliverer specific control command, with which the ordering system program, when it has received an ordering request for ordering one or more items from a terminal used by a user who belongs to a purchasing unit, specifies a deliverer who offers or delivers to the user the goods or service for each item number by referring the MD related information by each purchasing unit. In this way, in order to realize the configuration shown in FIG. 1 (FIG. 5 in the first embodiment) or actions shown in FIG. 2 (FIG. 12 in the embodiment), commands for realizing each of the processes and functions should be available, and the server-use computer should be driven based on the commands. The server-use computer operates each section and each function shown in FIG. 1 or FIG. 4 (FIG. 5 in the embodiment) by executing each command.

As described above, with the present embodiment, because the MD related information control handled items (MD) that can be traded between a group of users and dealers, each user can issue an order to a dealer predetermined by the purchase control department of the organization for example without being aware of who the dealer is at the time of ordering the item. Moreover, because each user can process orders to a plurality of dealers at one time, there is no need to place an order with each dealer or to take a different procedure for each sales store, thus reducing the time necessary for ordering and the cost of time and personnel needed for ordering.

Also, in an example of controlling expense item specific orders, because there will be no case where an order containing different expense items is handed over to the approval process, and on the other hand because an item group desired to be approved al the same time can be approved as a group order at the same lime, even if their dealers are different, the approval process and budget control become easy. Also, by ordering separately by expense item, when ordering process or verification is performed, the expense item of the purchase is already specified, and it is easy to obtain billing data etc. online because it was an order issued/received through communication with a server, enabling a reduction of business costs in accounting control and budget control of non-production materials, which is an indispensable field for company activities but not the major activity objective of the company.

Also, by means of the item specific ordering function, because many dealers are able to trade with a group of users, the number of kinds of items tradable by the ordering system is expected to increase. When the number of kinds of tradable expense items increases, purchase control of most of the non-production materials and subsidiary materials can be automated only with the work of selecting items.

First Embodiment

Figure 5:
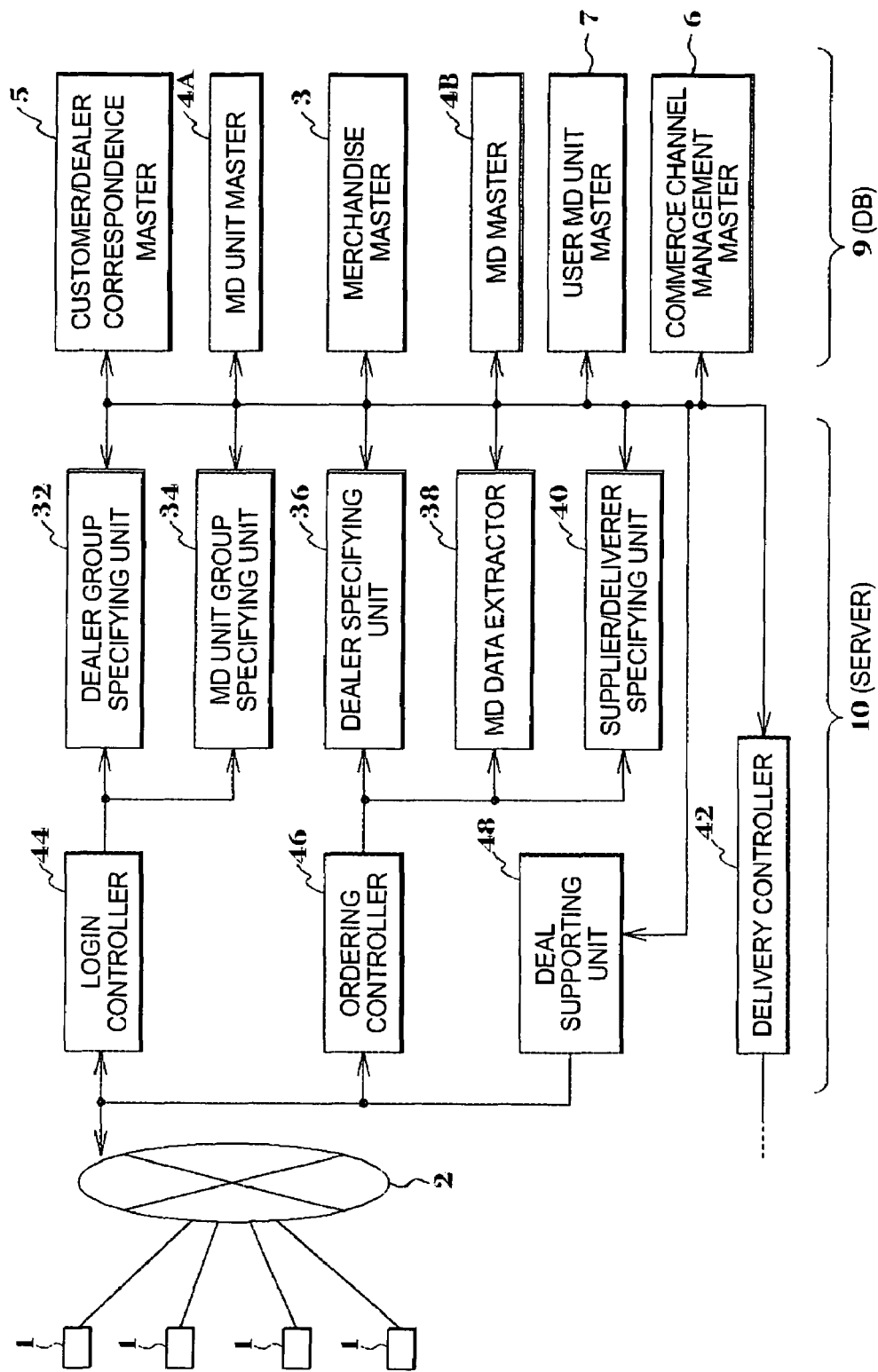
FIG. 5 is a block diagram showing a configuration example of the first embodiment of the present invention.

The first embodiment of the present invention is explained hereafter, with reference to the drawings. FIG. 5 is a block diagram showing an example of configuring a distribution facilitating system by the first embodiment of the present invention. The distribution facilitating system, other than functions by the ordering system shown in FIG. 1, automatically determines commerce channels from dealers to the item suppliers.

Because of this, once a user selects an item, the commerce channel from the supplier to the user (customer) of the item is automatically determined.

In the example shown in FIG. 5, the distribution facilitating system according to the present embodiment is equipped with a database 9 which memorizes various kinds of masters, and a server 10 which is connected via a network 2 with a specified terminal 1, controls sending/receiving of data with the terminal 1, and extracts or stores data of various kinds of masters in response to requests. Then, while the database has many kinds of masters necessary for supporting distribution, the following masters are especially installed in the present embodiment.

(1) Customer/dealer correspondence master 5 where a plurality of dealers are defined by item for each customer's purchasing unit in relation to the relationship between the specified purchasing unit of a customer and dealers who offer items such as goods and services to users who belong to the purchasing unit.

(2) MD unit master 4A where a purchasing unit which is one of user or customer's management unit and dealer are defined as keys, and an MD unit which identifies the MD of items offered from the dealer to the purchasing unit is defined.

(3) MD master 4B where the attribute information on items which belong to the MD identified by an MD unit of this MD unit master and item distribution such as suppliers and deliverers is defined as MD data.

(4) Merchandise master 3 where the attribute information on each item itself such as its specification and supplier is defined by item number.

(5) Commerce channel management master 6 where middle distributors such as wholesalers are defined according to the relationship among dealers, suppliers, and deliverers.

In the embodiment described above, an example where a dealer's MD for a group of users is managed as "MD related information" was explained. In the present embodiment, identification of the MD by a dealer to a group of users is performed by an "MD unit". In the MD unit information stored in the MD unit master 4A, but actual MD itself is not stored. In the present embodiment, MD is defined by combining MD unit ID and item number. This combination of MD unit ID and item number is called an MD in the present embodiment. This MD is stored in the MD master 4B.

In the present embodiment, the server 10 is equipped with a dealer group specifying unit 32 which specifies a dealer group for every customer's management unit by referring to the customer/dealer correspondence master, and an MD unit specifying unit 34 which specifies an MD unit group for every user or customer's management unit by referring the MD unit master.

Moreover, the server 10 is equipped with a dealer specifying unit 36 which specifies a unique dealer in the dealer group which trades with the user based on the MD data by each of a plurality of MD units specified by the MD unit specifying unit 34 and the item number selected by the user, an MD data extractor 38 which extracts unique MD data which is the MD data uniquely defined for each MD unit for each item number among individual MD data of MD unit group specified by the MD unit specifying unit by the item number based on the item number input by the user for ordering, and a supplier/deliverer specifying unit 40 which specifies a supplier and a deliverer of the item based on the MD data extracted by the MD data extractor.

Also, the server 10 is equipped with a deal supporting unit 48 which specifies a commerce channel from the supplier to the dealer by referring to the commerce channel management master according to the combination of the supplier, deliverer, and dealer, and supports procurement/sales in commerce channels, and a delivery controller 42 which performs a control for delivering the item from the deliverer to the user in the dealer's name. According to the configuration shown in FIG. 5, even when a plurality of dealers (MD units) are defined for a group of users, the commerce channel from the supplier to the customer is automatically determined in the stage when the user selects the item number for ordering.

Figure 6:
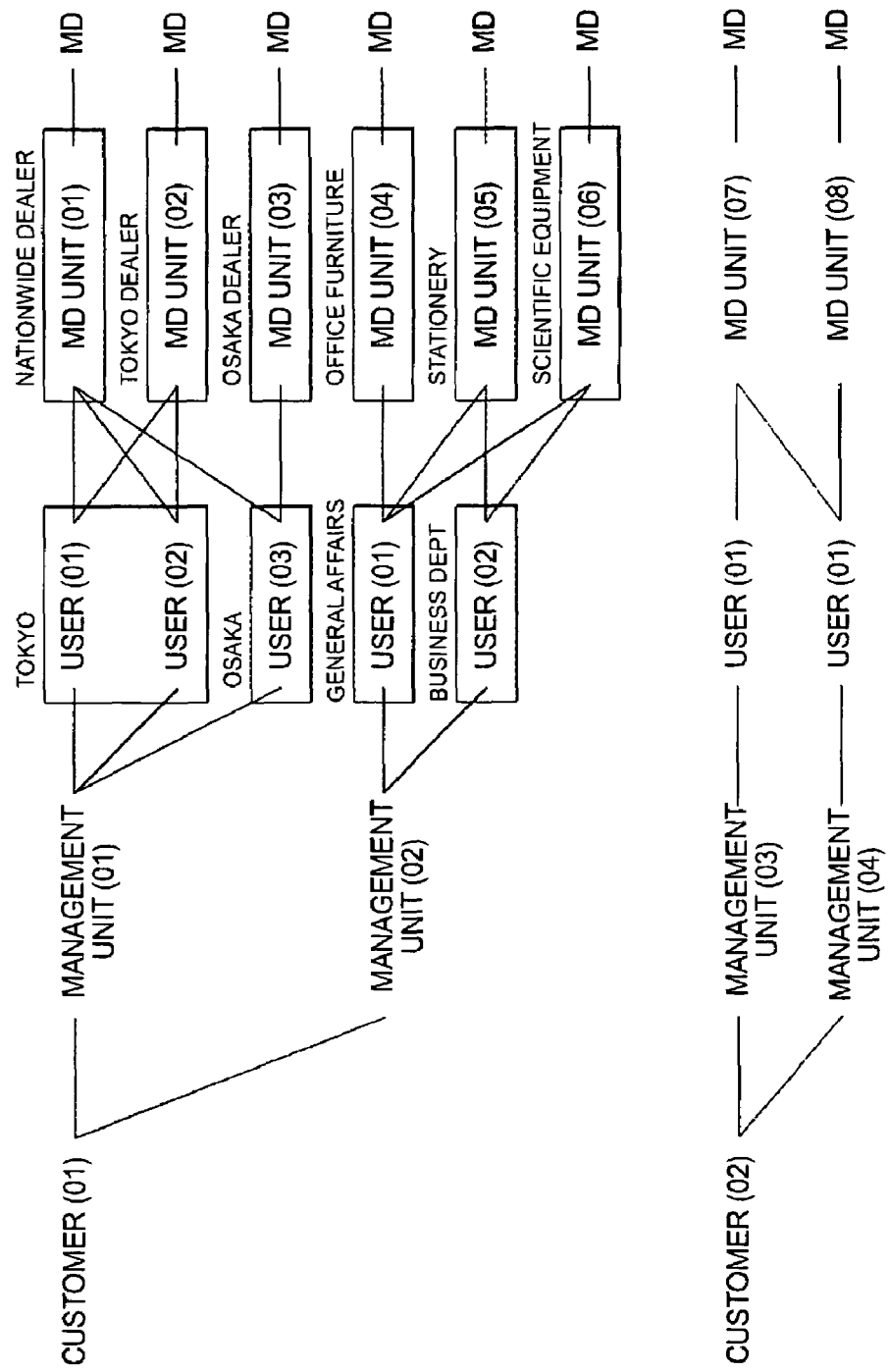
FIG. 6 is an explanatory chart showing the relationship between the MD unit and each user in the present embodiment.

FIG. 6 is an explanatory chart showing the relationship of MD units with each user in the embodiment. In FIG. 6, four management units of customers (01, 02) are shown as an example. The management unit ID attached to each management unit is uniquely assigned to all the customers, suppliers, middle distributors, and deliverers which can be used for mutual identification. Even a middle distributor needs non-production materials to perform its business, and becomes a customer in this case. In the present embodiment, instead of making each company itself to be a trading unit, a unit with a common purchase mechanism is made to be an independent management unit. For example, if the general affairs department and the business department have largely different mechanisms, they are regarded as different management units.

Users belong to each management unit. For example, users (01, 02) who live in Tokyo and a user (03) who lives in Osaka belong to a management unit (01). The number of management units and users are made small with the same explanation. Tho MD unit (01) of a dealer who is accessible over the entire nation for ordering from all the users. On the other hand, the MD (02) of a Tokyo dealer who mainly covers Tokyo area is accessed by users (01, 02) who live in Tokyo, and the user (03) who lives in Osaka accesses the MD (03) of an Osaka dealer instead of the Tokyo dealer. This is an example where users trade with different dealers depending on their location, even though they belong to the same management unit.

Assume that a user (01) of the general affairs department and a user (02) of the business department belong to a management unit (02), and that, although the user (01) of the general affairs department can order office furniture, authority of the business department does not allow ordering office furniture. In this case, the MD (04) of a dealer who offers office furniture is not accessed by the user (02). The stationery MD unit (05) and the scientific equipment MD unit (06) are set to be accessible in common. In the case of a dealer who offers both office furniture and stationery, the control can be made in such a way that MD units (04) and (05) are united and the user (02) of the business department is blocked from ordering by the unit of individual item.

Also, as in the case of a user (01) of a management unit (03), there is a case where only one MD unit is defined.

Figure 7:
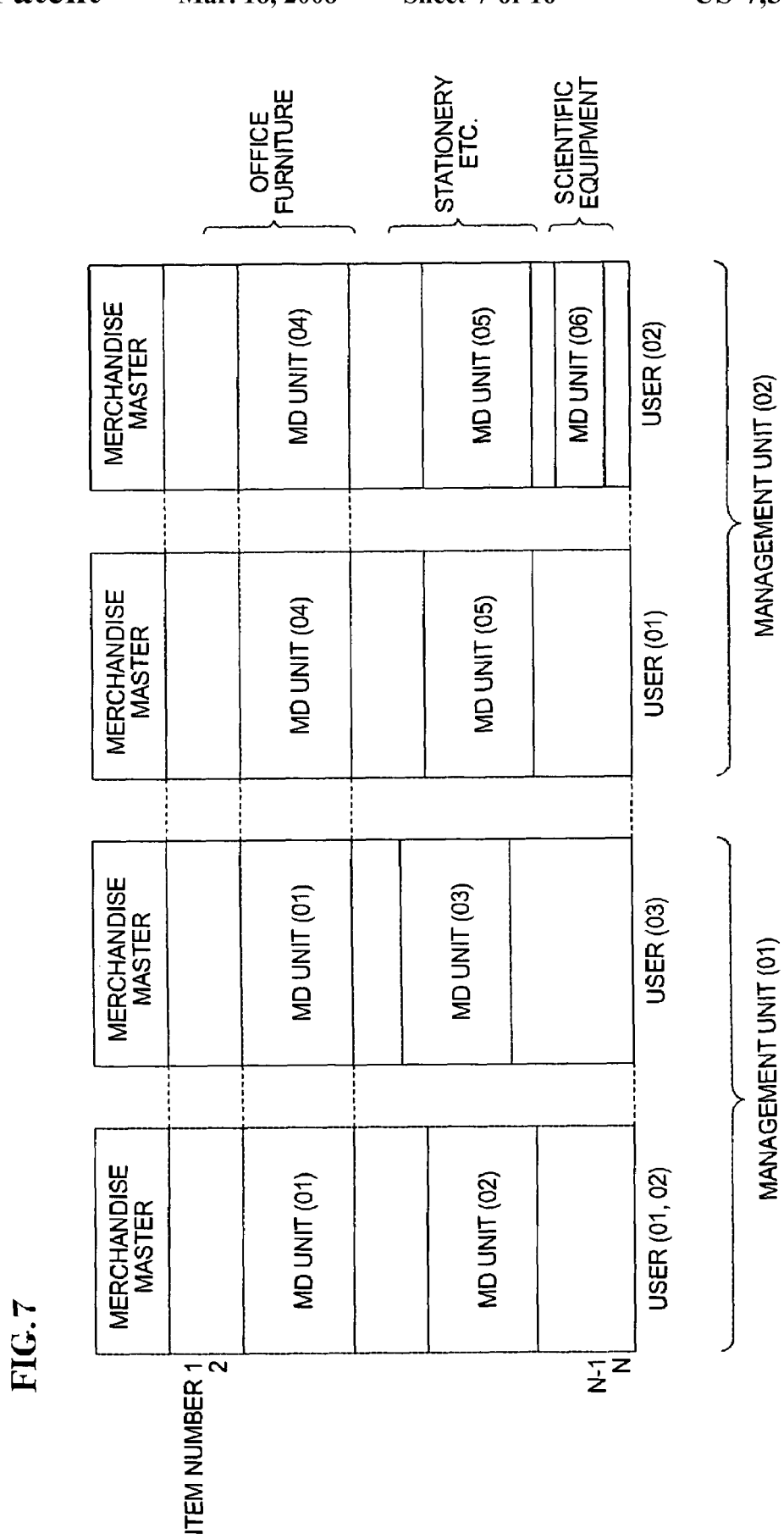
FIG. 7 is an explanatory chart showing the relationship between users and item numbers with the MD shown in FIG. 6.

FIG. 7 is an explanatory chart showing the relationship between MD units and item numbers. The merchandise masters shown in FIG. 7 contain all the items handled by the present embodiment (affiliation with other sites is not taken into account here). Then, all the items are identified by unique item numbers. When MD units are investigated with user as the unit, MD units do not have item numbers which overlap with one another. Thus, if an item number is specified by a user, a unique MD unit is specified, and a dealer identified by this MD unit is specified. The MD unit (02) of the users (01, 02) and the MD units of the user (03) partially overlap with each other, and part of them are different from each other. According to differences of dealers' MDs and users' tastes between Tokyo and Osaka, each dealer tries to offer the optimal MD to its customers.

In the example shown in FIG. 7, a group of item numbers (MD) by the MD unit (01) and the MD by the MD unit (04) coincide with each other. However, because MD units are generated dealer by dealer, if dealers are different, even if items of the MDs are the same, different MD units are prepared. Also, if management units are different, different MD units are prepared as well. Because offered prices to the customer and distribution attributes such as the deliverers according to the method of delivery are stored in each MD data, MD units are stored separately by management unit or dealer in this way. Once the MD unit ID group becomes clear, the logged-in user can access all the items that can be ordered.

Therefore, when items are searched with the keyword "office cleaning", it becomes possible to search cleaning tools, which is an MD of a dealer (10), consumables such as electric bulbs which is an MD of a dealer (11), and cleaning service which is an MD of a dealer (13).

Referring to FIG. 5, the server 10 is equipped with an ordering controller 46 which controls the temporary storage of item numbers of one ore more items ordered by a user as an ordered item number group. And, the dealer specifying unit 36 is equipped with a function for specifying a unique dealer in the dealer group based on the MD unit of the item number specified for each item number of the ordered item number group stored by the ordering controller 46. A maintenance responsibility management unit ID in an MD unit master is the management unit ID of a dealer who offers the MD.

In the present embodiment, after an MD unit is specified by a user ID and an item number, the dealer specification function automatically specifies at the ordering time a dealer who offers an to the user by referring to the maintenance responsibility management unit ID of the MD unit master. At this time, the dealer specifying unit 36 can specify the dealer without referring to the information on the dealer group specified by the dealer group specifying unit.

On the other hand, the dealer specified by this dealer specifying unit 36 is in the dealer group specified by the dealer group specifying unit.

In the state in which the user ID is determined, once an item number is determined, if MDs have no overlap, the MD unit ID can be uniquely specified. Because each MD is defined for every dealer, by a combination of a user ID and an item number, a unique dealer can be specified from among a plurality of dealers.

Also, if the ordering controller has an approval standard determined and a temporarily stored ordered item number or an ordered item group, and if the approval standards of the ordered item number and newly added item number are different, it may also be arranged so that the ordering controller 46 is equipped with an approval standard specific ordering control function 46A which does not accept the addition of new items and prompts the issuance of an order grouped by the same approval standard. Actions and effects of the approval standard specific ordering control function 46A are the same with those of the approval standard specific control function 16 shown in FIG. 1.

In the example shown in FIG. 5, the ordering controller 46 is equipped with a function to control the reception of confirmed orders to the ordered item number group from a user or other users such as an approver. This may be arranged so that it judges that a confirmed order has been made to the ordered item number group when approval of issuing an order is given from an approver. The supplier/ deliverer specifying unit is equipped with a function that, once a confirmed order is issued, it specifies the supplier and deliverer of the item number by referring the MD data identified by the MD unit for the user of the dealer specified by the dealer specifying unit 36 for each item number of the ordered item number group of the confirmed order. Namely, in the present embodiment, a unique supplier and deliverer are specified by a combination of a dealer and an item. Even when a plurality of suppliers exist such as in a live flowers gift service and a business card printing service, a user and a supplier for each item are specified when the MD related information is generated.

Moreover, the deal supporting unit 48 is equipped with a function for specifying a commerce channel of middle distributors from a supplier to a dealer as a unique distribution path according to combinations of a supplier and a deliverer specified by the supplier/deliverer specifying unit 40, and the dealer of the item number, by referring to the commerce channel management master 6, namely, in the present embodiment, once a combination of a dealer, a supplier, and a deliverer, a commerce channel from the deliverer to the supplier is uniquely specified. In this commerce channel, a dealer uniquely specifies a seller by each item or item group. This seller further specifies uniquely its seller. This chain of middle distributors makes the path unique to the supplier.

By making the deliverer a key to specify a commerce channel, the MD between the customer and the dealer can be made more abundant and flexible. For example, in the case of copying paper, normal purchases and urgent purchases are pre-determined, and direct delivery from a deliverer affiliated with the supplier is performed for a normal purchase. On the other hand, the dealer directly delivers copying paper to the user for urgent purchases.

In this case, the deliverer of copying paper for urgent purchases is the dealer himself. Therefore, there is no commerce channel generated. In order to automatically determine the commerce channel at high speed and with certainty during normal operations, while enabling the deliverer's status to be defined in various ways, it is arranged so that each commerce channel is determined according to the combination of a dealer, a supplier, and a deliverer. Also, instead of being limited to direct delivery from a supplier, by realizing a mechanism in a system similar to present commerce channels, it is the objective that, items of various kinds of industries can become tradable through the distribution facilitating system of the present embodiment. When the kinds of items increase, users are able to make even easier orders by the group ordering function, and the range in which accounting processing can be automated by the present embodiment can be expanded.

Next, major items of various kinds of masters are explained.

Figure 9:
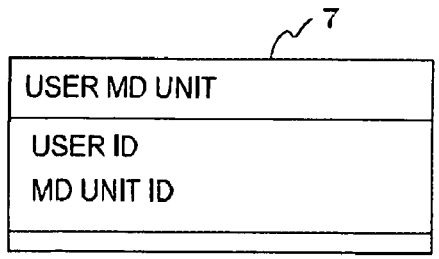
FIG. 9 is an explanatory chart showing a representative example of items of each master in the present embodiment, where
Figure 9:
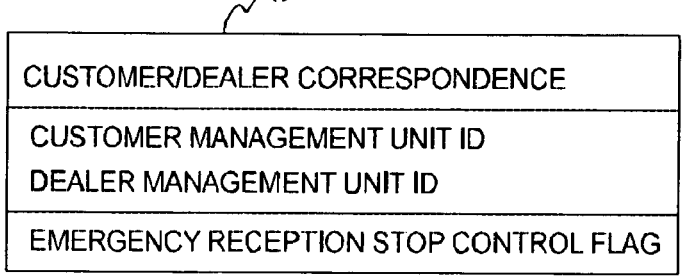
Figure 9:
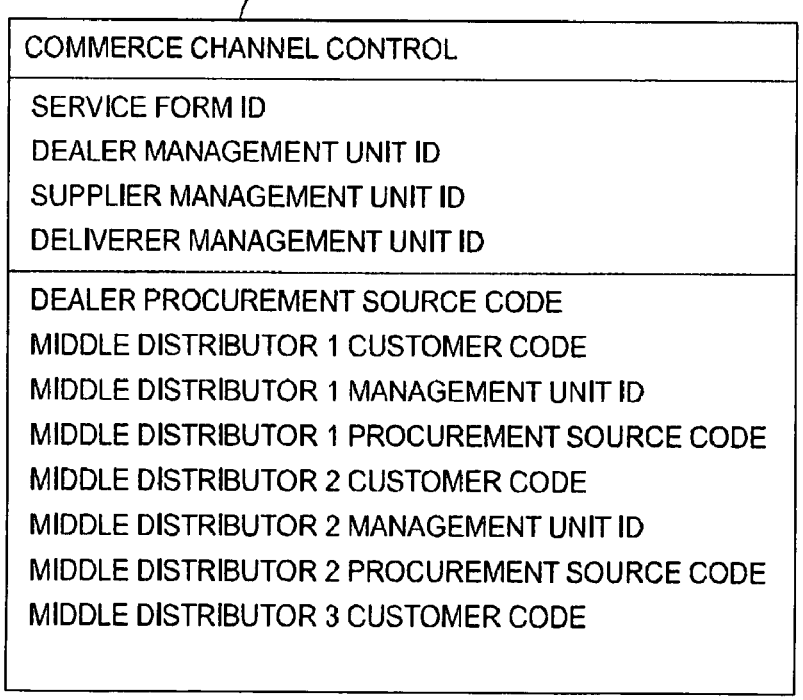

FIG. 8 is an explanatory chart showing examples of representative items of each master. Common to FIG. 8, FIG. 9, and FIG. 11, instead of all the items necessary for operating the system, only the necessary items for explaining the present embodiment are disclosed. Also, among the blocks of each master, the first box is the master name, which is an entity, a class, and a table name. The second box items are major keys, and the tables are defined for these items, respectively. The third box are data items input for each table.

FIG. 8(A) is a chart showing an example of items of the merchandise master. In the merchandise master, mainly the information offered from suppliers of goods and services is stored. Information which is different by dealer is not stored in the merchandise master.

In the merchandise master, items of the third box are stored as the item number keys to identify each item. Namely, for one item number, supply source maker code etc. are defined. In the example shown in FIG. 8(C), with a combination of the MD unit ID and item number as keys, offered price etc. are stored for each of this combination.

The merchandise master has, as its items, a supply source maker code used for merchandise control on the supplier side, a supplier ID for identifying the supplier, a plurality of deliverer judging flags indicating delivery-related status pre-determined for each item, such as that absence of a deliverer other than the dealer and specifiable deliverers, a special item number category indicating whether it is a special item number requiring different information from normal items at the time of ordering such as a live flowers gift service and a business cards printing service, another site affiliation category indicating whether it is an item controlled by another site such as the Web site of the affiliated supplier, a plurality of file names of images for introducing the content of the item to the users, a suggested retail prices when it is determined, and a scheduled date for updating this price.

The merchandise master also has a searching keyword and a merchandise category used when a user of a customer searches for necessary merchandise. This merchandise category is what identifies the category of each merchandise such as small classifications such as mechanical pencils, medium classifications such as writing implements, and large classifications such as stationery. There are various kinds of utilization methods of this merchandise category. When defining an expense item in MD data, for example, if stationery is all made an expense item of consumables, there is no need of defining an expense item for each item number, and an expense item can be defined for all items with a small number of operations referring to the merchandise category.

FIG. 8(B) is a chart showing an example of items of the MD unit master. The MD unit is a name of an MD proposed by a dealer to a management unit and selected by a customer. Also, important information for the entire MD is stored in this MD unit, too. In the example shown in FIG. 8(B), the MD unit is stored with an MD unit ID as the key. Also, in the present embodiment, used is a service form ID which identifies the form of the service offered by the system to the customers etc. such as the version of the distribution, facilitating system and the distribution facilitating system when the MD is set to be a pre-determined catalog. This service form ID is defined also for the MD unit.

The MD unit has, as its items, an MD unit name such as the name of a merchandise group, a maintenance responsibility management unit ID which is the ID of the management unit of a dealer who has responsibility for maintaining the MD identified by the MD unit and offers each item of the MD to the customers, a customer management unit ID which the user the MD is applied to belongs to, and a price related information display enable/disable flag which indicates whether the price, consumption tax, etc. of the item should be displayed or not in lo the data communication with the user. In the case of a largescale company, there are cases where a purchase subsidiary company exist which collectively controls purchases by the company and its group companies. The dealer to the company is the purchase subsidiary company, and a proposal of the MD is a dealer (a kind of middle distributor) who trades with this subsidiary company. In this case, imagined is an example where maintenance of the MD and providing the actual item are done by a dealer who trades with the purchase subsidiary company. In such a case, in the MD unit master, the dealer specified by the MD unit is better made to be not the purchase subsidiary company but the dealer who trades with that purchase subsidiary company. The dealer who has the purchase subsidiary company as its customer maintains the MD related information according to the agreements with the purchase subsidiary company etc. In this case, procurement and billing between the purchase subsidiary company and the dealer who has the purchase subsidiary company as its customer, and procurement and billing from the purchase subsidiary company to the customer is better controlled by another master.

The contents set by the price related information display enable/disable flag applies to all the items of the MD identified by the MD unit.

FIG. 8(C) is a chart showing an example of items of the MD master. The MD controls the attribute information necessary mainly for distribution of items with a combination of the MD unit ID defined in the MD unit master shown in FIG. 8(B) and the item number as the key. Here, for each item number of the MD identified with the MD unit, there are an offering price calculation method category which specifies a calculation method of offering price from a dealer to the customer, an offering price (in the case of actual amount method), a price factor (in the case of price factor to the purchasing or suggested retail price), a dealer purchasing price which is the price when a dealer purchases it from a wholesaler or a supplier, a supplier management unit ID which specifies the supplier of the item, a management unit ID of the deliverer, and an expense item code which specifies the expense item of the item of the user.

The MD master has, as its items, a general user ordering prohibition category which specifies with a category code (e.g., a number from 1 to 5) whether general users are prohibited from ordering the item from among the items identified by the MD unit or not, and an offering price rounding category which specifies the offering price rounding method, such as for the quantity, when it is offered in a unit of a certain quantity. If a prohibition category code described in the general user ordering prohibition category is stored in the user master, that item is prohibited from being ordered. This is used when the purchase is permitted for only those who have a certain budget authority, purchase by a specified department is prohibited, etc.

When an MD related information is mentioned, it means that information of this MD unit master and the MD master are united in one. Namely, the MD related master data in the present embodiment are equipped with an MD unit master and an MD master. When a plurality of MD units are defined for a purchasing unit, if they are defined so that items which can be handled by the plural number of MD units to the purchasing unit do not overlap among the MD units, group ordering to a plurality of dealers is easy to perform. This group ordering is also an item specific ordering function where dealers are divided by item.

FIG. 9(A) is a chart showing an example of items of the user/MD unit master. The user MD unit master 7 has, as its items, a user ID and an MD unit ID. Namely, it specifies to a user ID an MD unit group the user can access. Also, the user MD unit master 7 specifies a user group which accesses an MD unit. FIG. 9(B) is a chart showing an example of items of the customer/dealer correspondence master. The customer/dealer correspondence master 5 is stored with a management unit ID and a dealer management unit ID as keys. Namely, once the management unit ID of a customer is determined, a dealer group is specified. Also, once a dealer management unit ID is determined, a customer management unit group which becomes the customer of this dealer can be specified.

FIG. 9(C) is a chart showing an example of items of the commerce channel management master. The commerce channel management master is used for specifying the middle commerce channel from among a dealer, a supplier, and a deliverer. The commerce channel master 6 has a service form ID, a dealer management unit ID, a supplier management unit ID, and a deliverer management unit ID as keys. Therefore, instead of defining a commerce channel for each item, a middle commerce channel is specified according to the combination of these three. The commerce channel master has, as its items, first of all a dealer's stock supplier code which becomes the direct supplier to the dealer. Moreover, a combination of a customer, a management unit, and a stock supplier is defined for each player such as a customer code of a middle distributor 1 (a dealer's management unit ID), a management unit ID of a the middle distributor 1, a stock supplier code of the middle distributor 1 (a supplier or a middle distributor who becomes a direct stock supplier to the middle distributor 1).

When a supplier management unit ID is specified to a stock supplier code, the commerce channel is uniquely complete. The pattern of this commerce channel is often pre-determined, and the commerce channel management master is generated based on the pattern in generating MD related information.

Figure 10A:
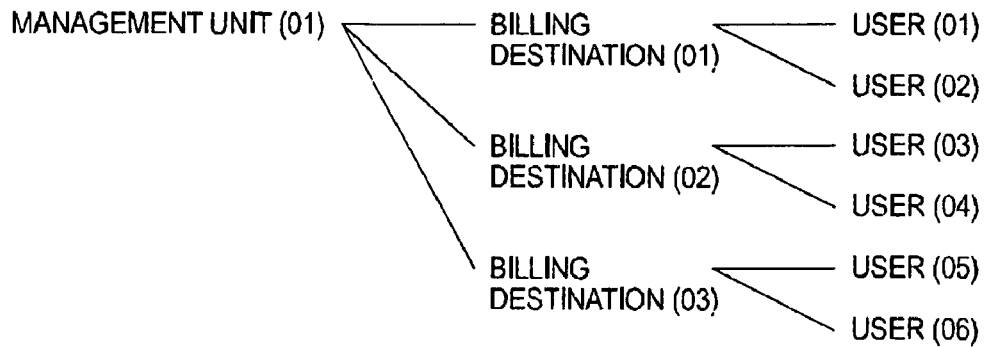
FIG. 10(A) is a chart showing the relationship with parties to be billed.
Figure 10B:
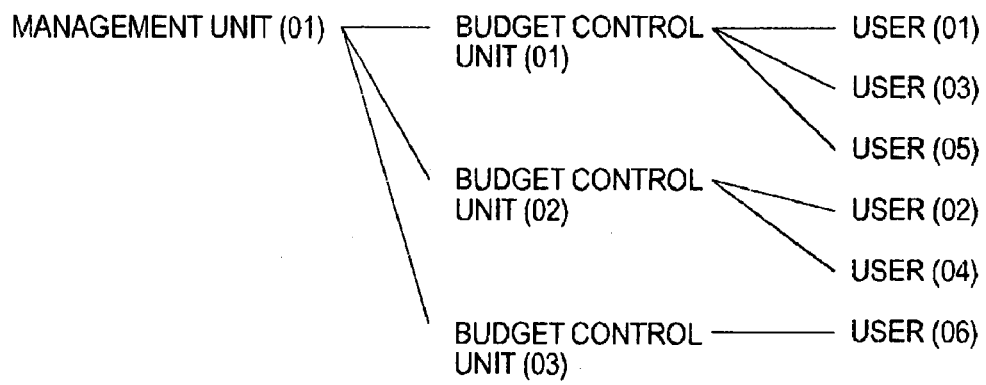
FIG. 10(B) is a chart showing The relationship wit budget control units.
Figure 10:
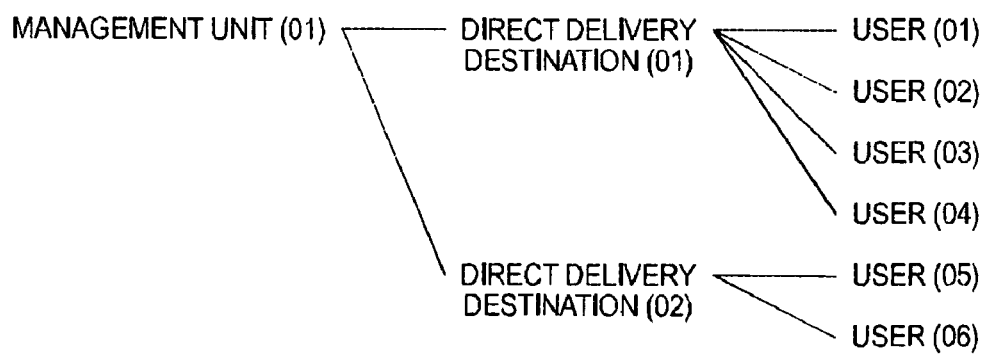
FIG. 10 is an explanatory chart showing an example of unit users belonging to the present embodiment, where

FIG. 10 is an explanatory chart showing an example of the user's affiliation unit in the present embodiment. Each user who belongs to a management unit, for example, performs billing with a certain department as the unit, there are cases where a project whose budget is across departments is the unit, and moreover even if in the same department, the offices are scattered and the recipient/destination of items are different. Because these relationships are diverse among organizations, the affiliation of users are set to multiple inheritance as shown in FIG. 10, and is arranged so that the billing destination ID etc. are stored in the user master which defines the user attributes as shown in FIG. 10.

FIG. 10(A) is a chart showing the relationship with a billed party, where users (01, 02) belong to the billed party (01). FIG. 10(B) is a chart showing the relationship with a budget control unit, where users (01, 03, 05) belong to the budget control unit (01). In the present embodiment, an approval standard (approval path, budget controller) on purchases is specified uniquely according to the budget control unit and expense item. Even when expense items are different, they may have the same approval standard. In this case, because the approval standards are the same, even if the items are in different expense items and handled by different dealers, users can order them grouped by the approval standard.

Because a user (06) can purchase items without going through other approvers, the budget control unit (03) is separated from other users. FIG. 10(C) is a chart showing the relationship with a direct delivery destination. This direct delivery destination is in general the work location of the user, or the office of the affiliated department.

FIG. 11(A) is a chart showing an example of items of the customer master. The customer master is stored with a management unit ID (customer management unit ID) as a key. In the customer master, data on the purchasing applied to the whole management unit are stored. On the other hand, a user master 52 is stored with a user ID as a key, and as shown in FIG. 10, in its items stored are various data on each user's affiliation in the management unit. A holiday flag is used for calculating the delivery date.

Figure 12:
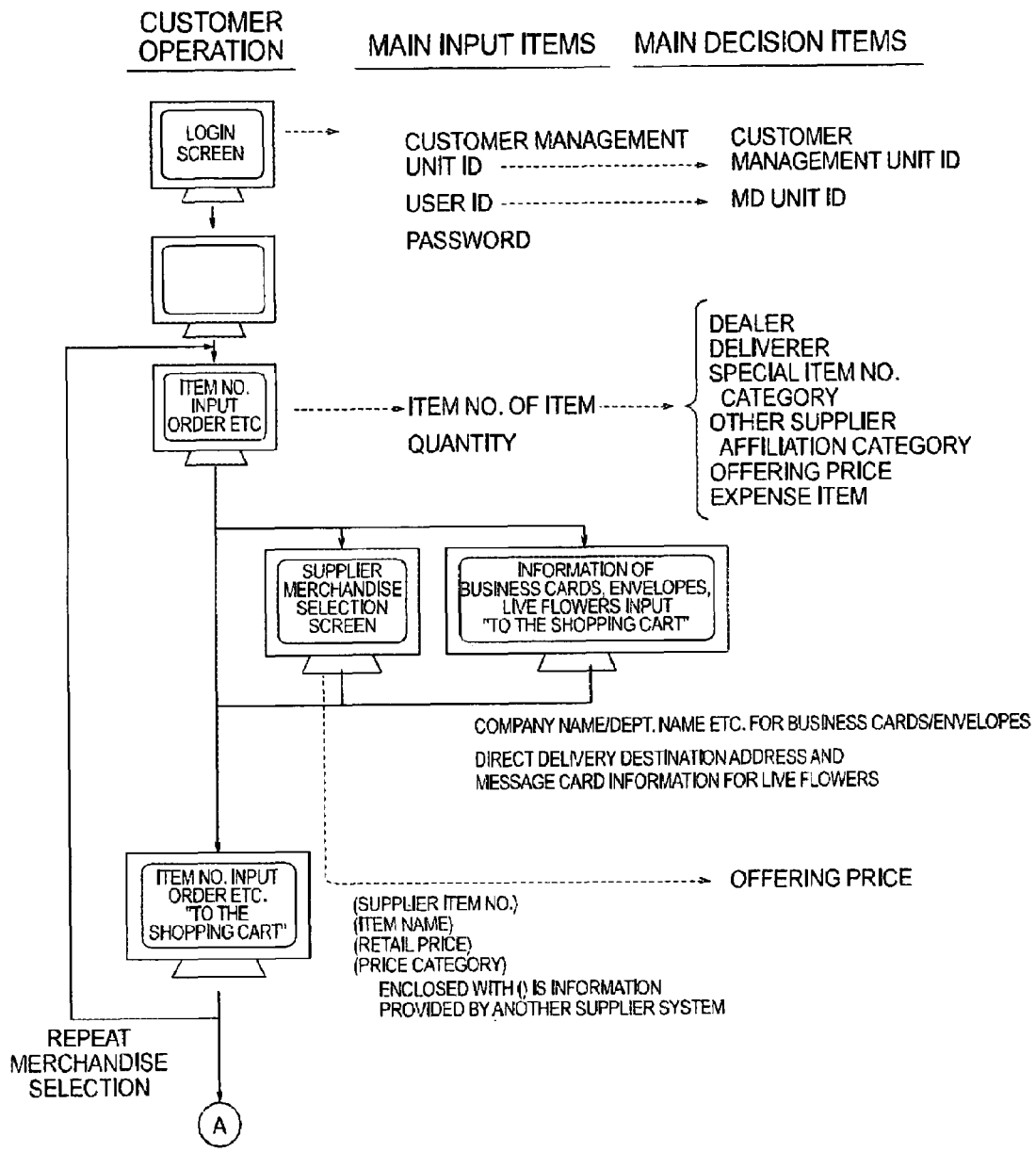
FIG. 12 is an explanatory chart showing the first stage of a representative action example in the present embodiment.

FIG. 12 and FIG. 13 are explanatory charts showing an example of the representative actions in the present embodiment. When accessed by a user, a login screen is displayed first. Here, a management unit ID and a user ID are input, and further, if a user certification using a password is successful, whether the user is a customer or a dealer is determined based on the management unit ID.

In the case of a customer, the customer/dealer correspondence master 5 is used for determining a dealer group who can trade with the customer management unit to which the user belongs. Also, an MD unit group is specified by the user ID.

In the main menu display for ordering, a banner advertisement of each dealer group, announcements, etc. may be displayed for example. Then, storing of items to a shopping cart is performed by an item number input ordering etc. Here, if the input item number does not exist in the MD groups which can be specified by the MD unit group, an error message that it cannot be handled or a message that communication to the department in charge of purchasing if the purchase is desired etc. may better be output.

Once an item number is specified, a dealer, a deliverer, whether it is a special item number such as business cards printing, whether an affiliation with other suppliers exists, the offering price, and the initial value of the expense item can be specified.

In the case of a special item number such as business cards printing and live flowers gift, input of each necessary information is requested. When ordering a merchandise of another supplier outside the system in affiliation with another site, the offering price is determined by obtaining the item number, retail price, etc. from another site using the specified other site affiliation function. Also, items are selected from various kinds of directions such as searching by use, searching by method of use, and ordering by referring to the ordering history of the last time, and they are put into a shopping cart. At this time, if an operation of putting an item of a different expense item is performed, a message asking that it be ordered separately because the expense item is different may better be displayed. By this means, a unique approval path can be specified in one order.

Therefore, it is possible to specify an ordered item number group by the MD related information so that items covering across a plurality of dealers can be ordered at one time, obtaining the approval result on this ordered item number group in a one time approval process. Because the approver is also a user, approval can be performed using a customer terminal. Thus, a group ordering with approval as the unit can be performed. Compared with creating an order request with a handwritten slip for each dealer, creating an approval document that sums them up, and circulating the document from one approver to another, time spent by a user for purchasing can be greatly reduced.

As shown in FIG. 13, once an order is issued, the presence/absence of approval and the approval method are specified according to the user and expense item, if approval is unnecessary, issuing this order is confirmed. If it is a confirmed order, the supplier, middle distributor, and sales amount, stocking, etc. in the commerce channel are determined. A delivery note, an invoice, etc. between players in the commerce channel are printed in the pre-determined scheme and sent in each name.

If an approval is necessary, approval or denial is specified, and in the case of denial, the order is canceled. Once the final approval is obtained, it is determined that the order is confirmed. In this order, a budget control with the lower limit or the total accumulated amount may be performed for each budget control unit.

As stated above, in the present embodiment, by maintaining the relationship between a dealer group and a user as MD related information, a group order (item specific order) is realized.

Also, purchase control can be simplified in the customer's purchasing department and the purchase subsidiary company. Moreover, on the dealer side, because order receiving processing of the standard items is automated, business resources can be used for more individual services. Namely, the first embodiment can also function as an application service provider system for the sale of standard items to sales stores. In this case, monthly sales and invoices can be automatically calculated by automatically determining the prices offered to the customers and the purchase prices from the middle distributors and also electronically obtaining delivery complete notices from the deliverers.

Second Embodiment

Figure 14:
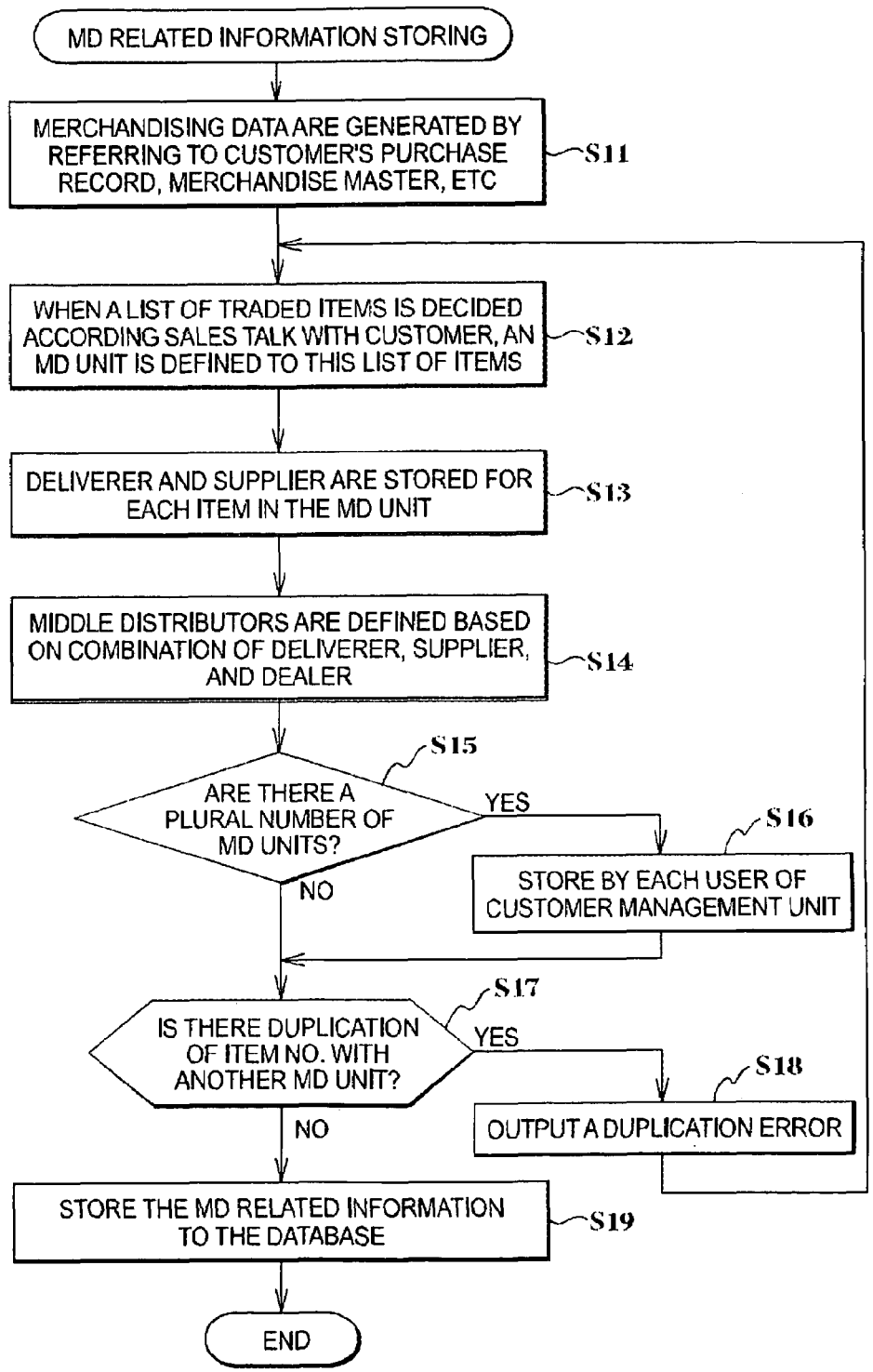
FIG. 14 is a flow chart showing an example of an MD storing processing by the second embodiment of the present invention.

The second embodiment of the present invention is explained hereafter, with reference to the drawings. In the second embodiment, a method of generating the MD related information (MD identified with MD units) used in the embodiment and the first embodiment is disclosed. FIG. 14 is a flow chart showing an example of configuring the method of storing the MD related information by the second embodiment. First of all, a dealer user who tries to conclude with a periodic purchase contract of standard items with a customer uses a terminal of the dealer to generate a list of items to propose for the customer based on the merchandise master (Step S11, Merchandise data generation process).

Subsequently, a trade talk is held between the person in charge of purchasing of the customer and the dealer user using the merchandising data generated by the merchandising data generation process S11, and when a list of items is specified by the customer's department in charge of purchasing etc., the MD unit for identifying the MD which is a list of items is defined for each purchasing unit such as each user of the customer (Step S12, MD unit definition process).

Further, a supplier and a deliverer are stored for each item contained in the MD identified by the MD unit defined by this MD unit definition process S12 (Step S13, Supplier/deliverer storing process). At this time, if items not stored in the merchandise master are stored in the MD, the item is added to the merchandise master beforehand. This added item can be included in the MD by other dealers to other customers. Subsequently, based on the relationship among the supplier and deliverer stored in the supplier/deliverer storing process S13 and the dealer, a commerce channel from the supplier to the dealer is defined (Step S14, Middle commerce channel definition process).

Subsequently, when there are a plurality of MD units in the customer management unit (Step S15), an MD unit is stored for each user of the customer management unit (Step S16, User specific MD unit storing process). Furthermore, if another dealer for the customer has a duplicated item number when an MD is stored, an item number duplication error is output (Step S18, Item number duplication checking process). On the other hand, if there is no error, a supplier and a deliverer are defined for each item of the MD unit and stored in the MD master (Step S19, MD storing process).

Figure 15:
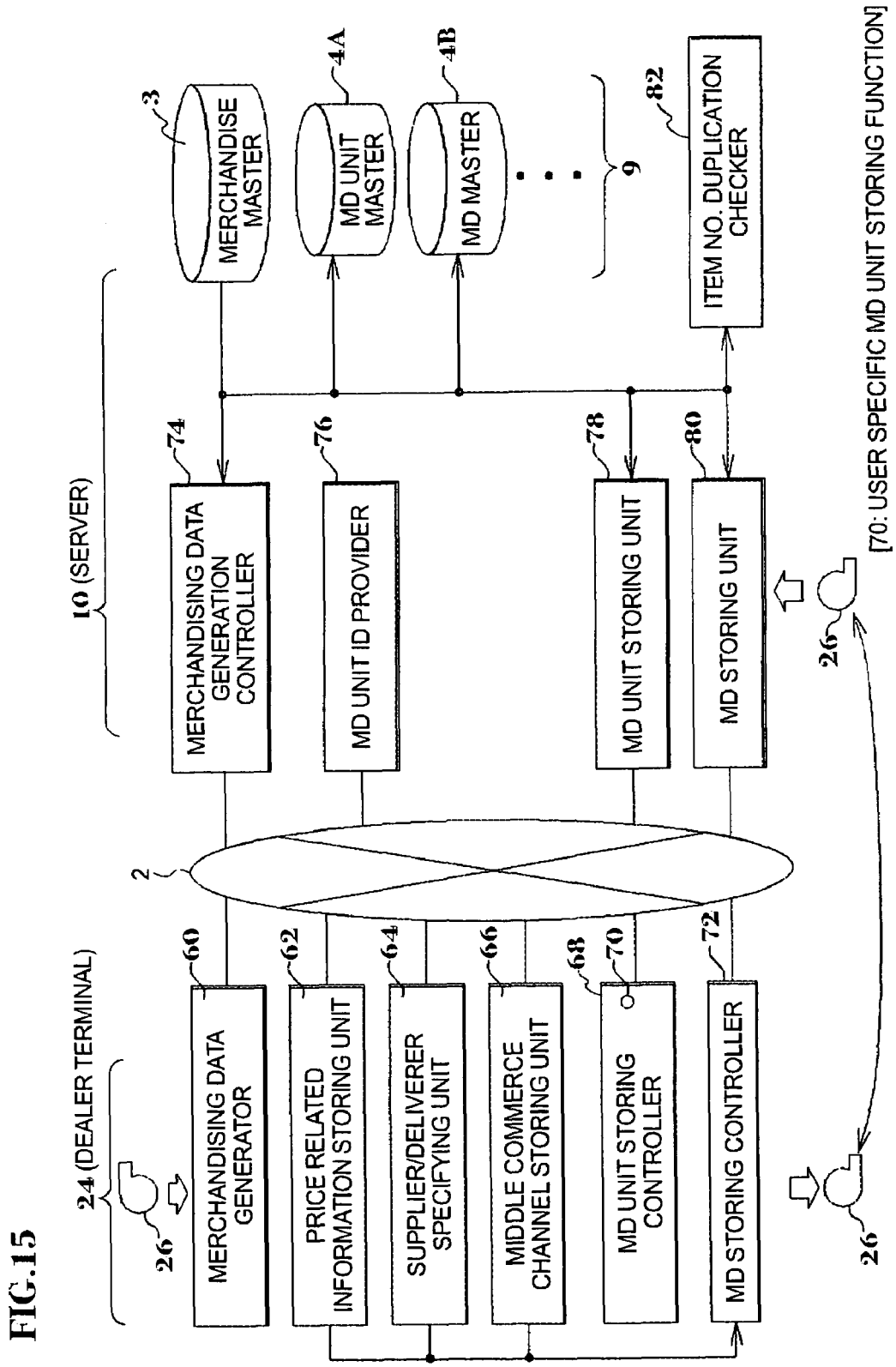
FIG. 15 is a block diagram showing a configuration example of the MD storing device by the second embodiment.

FIG. 15 is a block diagram showing an example of configuring the MD related information storing device of the second embodiment.

The MD related information storing device by this embodiment generates MD related information used in the distribution facilitating system disclosed in the first embodiment. As stated above, the distribution facilitating system is equipped with a database 9 which memorizes various kinds of masters such as the merchandise master where information on items such as goods and services provided by a supplier and delivered or offered by a deliverer, and a server 10 which is connected with a specified terminal via the network 2, controls data communication with the terminal, and extracts or stores data from/to various kinds of masters upon request.

The MD related information storing device of this embodiment can be realized in a client/server form using Web related technology, and can be said to be an ASP which provides the function of storing MD related information in the dealer terminal 24 of a dealer. In FIG. 15, a division is made into a function group which can be realized on a browser of the dealer terminal 24 and a function group on the server 10. As shown in FIG. 15, for the functions of the MD related information storing device dealer terminal 24, it is equipped with a merchandising data generator 60 which generates a list of items that a dealer user who tries to concluded with a periodic purchase contract of standard items which a customer proposes to the customer based on the merchandise master 3 using the dealer's terminal 24, a price related information storing unit 62 which stores by item or item group the price related information such as the price factor of each item on the procurement/sales amount relationship from the dealer to the supplier, a supplier/deliverer specifying unit 64 which specifies a supplier and a deliverer of each item which belongs to the MD identified by the MD unit ID provided by the MD unit ID provider 16, and a middle commerce channel distributor storing unit 66 which stores middle distributors such as a wholesaler according to the relationship between the supplier and the dealer specified by the supplier/deliverer specifying unit 64.

The dealer terminal 24 is further equipped with an MD unit storing controller 68 which controls storing of MD units to the MD master, and an MD storing controller 72 which stores the supplier and deliverer specified by the supplier/deliverer specifying unit 64 and stores the MD data to a magnetic tape 26 etc.

The server 10 is equipped with an MD unit ID provider 76 which, when a list of items is specified by a customer according to the merchandising data generated by the merchandising data generator 60, gives an MD unit ID to the MD which is a list of items of the dealer to the customer, an a MD storing unit 80 that stores the MD read out from the magnetic tape 26 etc. in the MD master 4B, and an item number duplication checker 82 that outputs an item number duplication error when an MD is stored by the MD storing unit 80 and an item number is duplicated with another dealer for the customer.

Also, in the example shown FIG. 15, the MD unit storing unit 78 is equipped with a user specific MD unit storing function 70 which, when a plurality of MD units exist for a customer, stores the MD units separately for each user who becomes the purchasing unit of the customer. By the configuration shown in FIG. 15, MD related information for enabling group ordering is generated and stored in the master.

Also, in a preferred embodiment, it may be arranged so that the server is equipped with a new item time merchandise master updating unit which, when the server tries to store an item not stored in the merchandise master in the MD, controls new storing of the item to the merchandise master, and an original item number flag storing unit that, when the item updated by this new item time merchandise master updating unit is the original of the dealer, stores an original item number flag in the merchandise master for prohibiting the use of the item by another dealers' MDs.

The new item time merchandise master updating unit, when adding an item not stored in the merchandise master to the MD, first stores it to the merchandise master and especially allows it to obtain a unique item number in the merchandise master. The new item time merchandise master, if the item to be stored newly is a new merchandise of a specific supplier, may prompt the supplier to store the new merchandise, and if it is a service a dealer offers directly to the customer and the dealer himself is the supplier of the item, and the dealer himself stores it in the present embodiment. This item original to the dealer is called an original item.

Then, the original item number flag storing unit, when storing this original item number to the merchandise master, may better store an original item number flag showing that the item is an original item in the merchandise master.

The original item number flag may be a category data indicating whether it is an original item number or not. And, when another dealer accesses the merchandise master for creating an MD data, an MD with any item with this original item number flag stored is prohibited. Thus, consistency between the merchandise master and the dealer specific MD master can be maintained.

Figure 16:
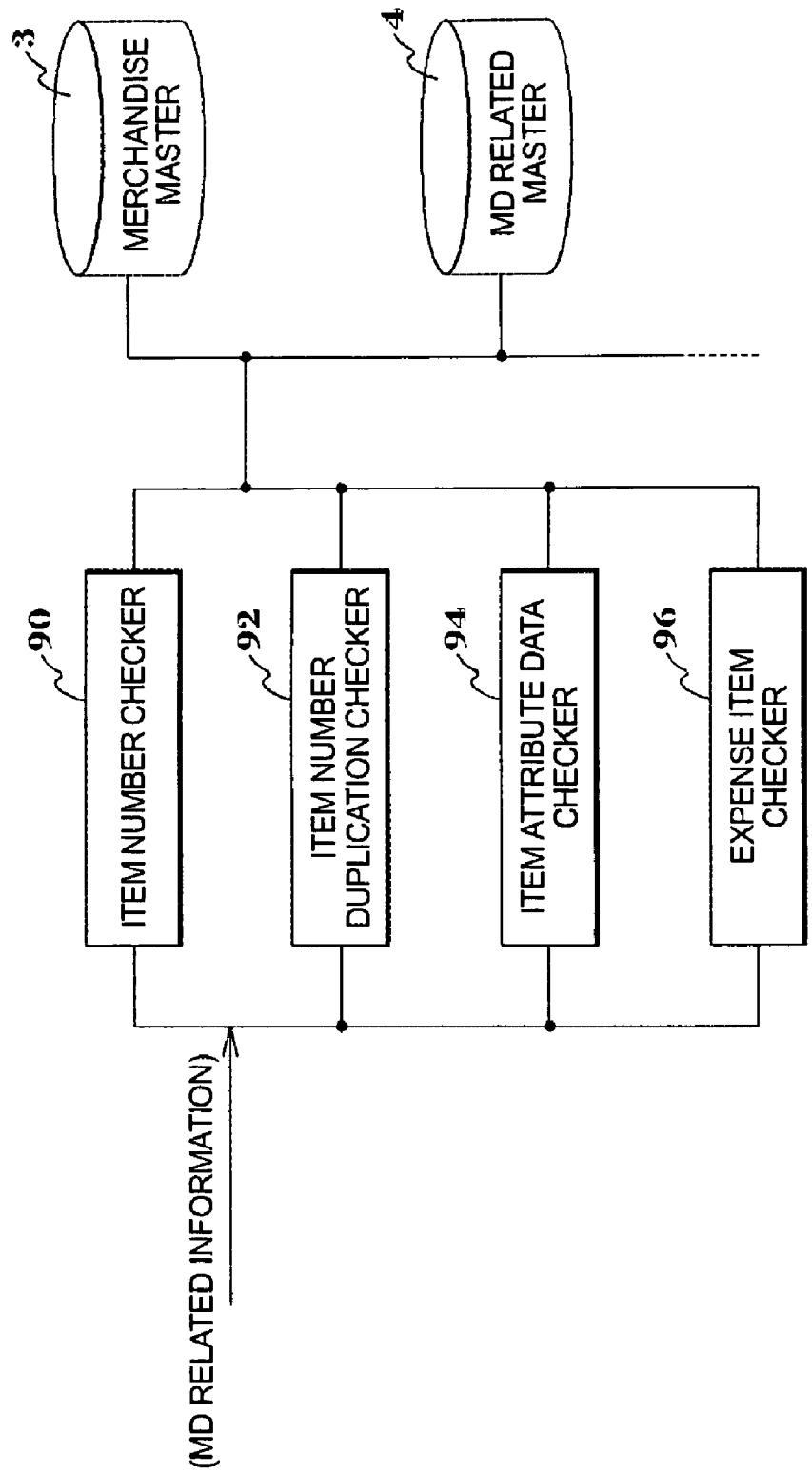
FIG. 16 is a block diagram showing a configuration example of the MD checking device.

FIG. 16 is a block diagram showing an example of configuring the MD related information checker in the second embodiment. In the example shown in FIG. 16, consistency of a list of item numbers which is an MD of items such goods and services offered to customers and the MD related information where the attribute information on distribution such as supplier and deliverer of each item in the MD are checked.

This MD related information checker is equipped with an item number checker 90 that checks whether the item number in the MD specified by the MD related information is stored in the merchandise master, and an item number duplication checker 92 that checks whether the item number contained in the MD unit data is stored in another MD related information for the customer. It is equipped with an item attribute data checker 94 that checks whether a deliverer who delivers each item of the MD to the customer, a supplier who has a stock of the item, and a price determination method of the item to the customer are stored or not. Also, the MD related information checker may be equipped with an expense item checker 96 that checks whether an expense item used for budget control or accounting control defined specifically for each user of the customer of the item is stored in storing the MD data.

The MD related information checker, when it is determined by the item number checker 90 that there is no item number, may better guide the processing where it is stored in the merchandise master and the MD related information as the dealer's original item number of the MD related information. If duplication of the item number is discovered by the item number lo duplication checker 92, a control may be performed so that the person in charge of the customer's purchase is notified that one of the dealers should be selected. If an item whose deliverer is not specified by the item attribute data checker 94 and no delivery path is discovered, a control may be performed to lead to a processing where the dealer becomes the deliverer or another deliverer is selected.

What is claimed is:

1. A system for ordering items comprising:
a server for controlling data communication with a plurality of terminals via a network,
a database accessible by the server comprising:
a merchandise master which stores information on all items offered from a plurality of dealers to a plurality of customers according to item numbers unique to each item, and
a merchandise assortment related master which stores a list of traded items and the item numbers among the items stored in the merchandise master agreed upon between the customer and the dealer as merchandise assortment related information according to each purchasing unit of the customer and each dealer who offers the item to the customer; and
a terminal for submitting to the server an ordering request for ordering at least one item from a user who belongs to a purchasing unit,
wherein the server comprises an item specific order controller for specifying, for each item in the ordering request, a dealer who offers the item, based on the merchandise assortment related information of the purchasing unit to which the user belongs,
wherein the merchandise assortment related master stores merchandise assortment related information groups for each of the dealers in a state in which item numbers of items purchased by the customer are not duplicated by a plurality of dealers,
wherein the item specific order controller comprises:
a function for determining a purchasing unit of a user who accessed from the terminal and specifying the merchandise assortment related information group for the purchasing unit, based on the determined purchasing unit,
a function for displaying an electronic catalog comprising a list of all items stored in the specified merchandise related information group on the terminal,
a function for, upon the user selecting an item, specifying the unique merchandise related information of the selected item number, among the merchandise related information group, and
a function for specifying a dealer of the item number based on the specified merchandise assortment related information,
wherein said merchandise assortment related master relates and stores merchandise unit identification that indicates merchandise assortment proposed by a dealer whose management unit is indicated by a dealer management identification to a purchasing unit of a customer and selected by the customer as indicated by a customer management unit identification,
wherein the customer management identification, the dealer management identification, and a deliverer management identification indicating a deliverer for providing or delivering item number, price, goods or services, and supplier management identification indicating a supplier who provides goods or services for a user,
wherein the server further comprises a deliverer specific controller for retrieving and specifying a deliverer who delivers goods or services in the merchandise assortment related master based upon a purchasing unit identification of the user that indicates the purchasing unit as a key, and a supplier providing the goods or services for the customer when receiving an ordering request from the terminal used by the user who belongs to the purchasing unit, and
wherein the item specific controller specifies a unique dealer who offers each item in an ordering request, from among plural dealers who contract with a user belonging to a customer management unit identified with a customer management unit ID to offer an item, by referring a MD unit ID specified and a MD related master based upon an item number received.

2. The system of claim 1, wherein the item specific ordering controller further comprises:
a function for adding an item selected by the user to an ordering request group when an approval standard of the selected item and an approval standard of a previously selected item are the same; and
a function for rejecting addition of the selected item to the ordering request group when the approval standard of the selected item and the approval standard of the previously selected item are different, and for prompting group-ordering with different dealers by the same approval standard without accepting addition of items having different approval standards.

3. An application service provider (ASP) system for issuing and receiving orders which provides an order issuing function to a terminal of a user who belongs to a purchasing unit of a customer, and provides an order receiving function to a terminal of a dealer who offers an item identified by an item number to the customer, the ASP system comprising:
a server for controlling data communication with the terminals via a network;
a database accessible by the server comprising:
a merchandise master which stores information on all items offered from a plurality of dealers to a plurality of customers according to item numbers unique to each item, and
a merchandise assortment related master which stores a list of traded items and the item numbers among the items stored in the merchandise master agreed upon between the customer and the dealer as merchandise assortment related information according to each purchasing unit of the customer and each dealer who offers the item to the customer,
wherein the server comprises an item specific order controller for specifying, for each item in the ordering request, a dealer who offers the item, based on the merchandise assortment related information of the purchasing unit to which the user belongs,
wherein the merchandise assortment related master stores merchandise assortment related information groups for each of the dealers in a state in which item numbers of items purchased by the customer are not duplicated by a plurality of dealers, and
wherein the item specific order controller comprises:
a function for determining a purchasing unit of a user who accessed from the terminal and specifying the merchandise assortment related information group for the purchasing unit, based on the determined purchasing unit,
a function for displaying an electronic catalog comprising a list of all items stored in the specified merchandise related information group on the terminal,
a function for, upon the user selecting an item, specifying the unique merchandise related information of the selected item number, among the merchandise related information group, and a function for specifying a dealer of the item number based on the specified merchandise assortment related information, wherein said merchandise assortment related master relates and stores merchandise unit identification that indicates merchandise assortment proposed by a dealer whose management unit is indicated by a dealer management identification to a purchasing unit of a customer and selected by the customer as indicated by a customer management unit identification, wherein the customer management identification, the dealer management identification, and a deliverer management identification indicating a deliverer for providing or delivering item number, price, goods or services, and supplier management identification indicating a supplier who provides goods or services for a user, wherein the server further comprises a deliverer specific controller for retrieving and specifying a deliverer who delivers goods or services in the merchandise assortment related master based upon a purchasing unit identification of the user that indicates the purchasing unit as a key, and a supplier providing the goods or services for the customer when receiving an ordering request from the terminal used by the user who belongs to the purchasing units and wherein the item specific controller specifies a unique dealer who offers each item in an ordering request, from among plural dealers who contract with a user belonging to a customer management unit identified with a customer management unit ID to offer an item, by referring a MD unit ID specified and a MD related master based upon an item number received.

4. A computer program product having a record medium for controlling issuing and receiving orders by using a server of an ordering system, wherein the system comprises a database which stores a merchandise master for storing item related information, and the server controls data communication with terminals via a network and performs data extraction from and storing to the database upon request, the program causing the server to:

store information on all items offered from a plurality of dealers to a plurality of customers according to item numbers unique to each item as the merchandise master;

store a list of traded items and the item numbers among the items stored in the merchandise master agreed upon between a customer and a dealer as merchandise assortment related information according to each purchasing unit of the customer and each dealer who offers the item to the customer as a merchandise assortment related master in the database, wherein the merchandise assortment related master stores merchandise assortment related information groups for each of the dealers in a state in which item numbers of items purchased by the customer are not duplicated by a plurality of dealers;

determine a purchasing unit of a user using a terminal; and control, for an item specific order, of specifying, for each item in an ordering request received from the user, a dealer who offers the item, based on the merchandise assortment related information of the purchasing unit to which the user belongs, wherein the control comprises:

specify the merchandise assortment related information group for the purchasing unit, based on the determined purchasing unit;

display an electronic catalog comprising a list of all items stored in the specified merchandise related information group on the terminal;

upon selection of an item by the user, specify the unique merchandise related information of the selected item number, among the merchandise related information group, and specify a dealer of the item number based on the specified merchandise assortment related information, wherein said merchandise assortment related master relates and stores merchandise unit identification that indicates merchandise assortment proposed by a dealer whose management unit is indicated by a dealer management identification to a purchasing unit of a customer and selected by the customer as indicated by a customer management identification, wherein the customer management identification, the dealer management identification, and a deliverer management identification indicate a deliverer for providing or delivering item number, price, goods or services, and supplier management identification indicating a supplier who provides goods or services for a user, and wherein the server further retrieves and specifies a deliverer who delivers goods or services in the merchandise assortment related master based upon a purchasing unit identification of the user that indicates the purchasing unit as a key, and a supplier providing the goods or services for the customer when receiving an ordering request from the terminal used by the user who belongs to the purchasing unit, and wherein the program causes the server to specify a unique dealer who offers each item in an ordering request, from among plural dealers who contract with a user belonging to a customer management unit identified with a customer management unit ID to offer an item, by referring a MD unit ID specified and a MD related master based upon an item number received.

* * * * *